(12) United States Patent
Chang et al.

(10) Patent No.: US 10,631,268 B2
(45) Date of Patent: Apr. 21, 2020

(54) USER EQUIPMENT, BASE STATION, AND METHOD FOR PAGING

(71) Applicants: Ningjuan Chang, Shanghai (CN); SHARP KABUSHIKI KAISHA, Sakai, Osaka (JP); FG Innovation Company Limited, Tuen Mun (CN)

(72) Inventors: Ningjuan Chang, Shanghai (CN); Renmao Liu, Shanghai (CN)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/320,874

(22) PCT Filed: Jul. 27, 2017

(86) PCT No.: PCT/CN2017/094621
§ 371 (c)(1),
(2) Date: Jan. 25, 2019

(87) PCT Pub. No.: WO2018/019267
PCT Pub. Date: Feb. 1, 2018

(65) Prior Publication Data
US 2019/0166578 A1 May 30, 2019

(30) Foreign Application Priority Data
Jul. 28, 2016 (CN) .......................... 2016 1 0608661

(51) Int. Cl.
*H04W 68/02* (2009.01)
*H04W 4/20* (2018.01)
*H04W 68/06* (2009.01)

(52) U.S. Cl.
CPC ........... *H04W 68/025* (2013.01); *H04W 4/20* (2013.01); *H04W 68/02* (2013.01); *H04W 68/06* (2013.01)

(58) Field of Classification Search
CPC .................................................. H04W 68/025
(Continued)

(56) References Cited

U.S. PATENT DOCUMENTS

| | | | |
|---|---|---|---|
| 2012/0094699 A1* | 4/2012 | Tamura | ................. H04W 48/12 455/458 |
| 2012/0327856 A1 | 12/2012 | Jung et al. | |

FOREIGN PATENT DOCUMENTS

| | | |
|---|---|---|
| WO | 2011/038243 A2 | 3/2011 |
| WO | 2011/108897 A2 | 9/2011 |

OTHER PUBLICATIONS

Ericsson, "Text proposal for non-anchor Paging", R2-1700769, 3GPP TSG-RAN WG2 #97 Athens, Greece, Feb. 13-17, 2017.
(Continued)

*Primary Examiner* — Joel Ajayi
(74) *Attorney, Agent, or Firm* — ScienBiziP, P.C.

(57) ABSTRACT

The present invention discloses a method for paging performed at user equipment (UE). The method comprises: receiving, from a base station via a system information block (SIB), paging control channel (PCCH) configuration information for one or a plurality of non-anchor carriers available for receiving a paging message (S101); applying the received PCCH configuration information to the one or plurality of the non-anchor carriers (S102); and receiving a paging message on at least one non-anchor carrier according to PCCH configuration information for the at least one of the one or plurality of the non-anchor carriers (S103). The
(Continued)

present invention also discloses a corresponding method for paging performed at a base station, as well as corresponding UE and base station.

4 Claims, 8 Drawing Sheets

(58) Field of Classification Search
USPC .......................................................... 455/458
See application file for complete search history.

(56) References Cited

OTHER PUBLICATIONS

ZTE, "Consideration for paging on multi-carrier in Nb-IoT", R2-164858, 3GPP TSG-RAN WG2 Meeting#95 Gothenburg, Sweden, Aug. 22-26, 2016.
Intel Corporation, "Multiple carrier operation for NB-IoT", R2-161261, 3GPP TSG RAN WG2 #93 St Julian, Malta, Feb. 15-19, Feb. 2016.

* cited by examiner

USER EQUIPMENT, BASE STATION, AND METHOD FOR PAGING

TECHNICAL FIELD

The present invention relates to the technical field of wireless communication, more specifically, to a method for paging and corresponding user equipment and base station.

BACKGROUND

With the extensive application of the Internet of Things and its terminal devices, it becomes crucial to address the matter of designing a wireless network technology adapted for the communication of the Internet of Things. The 3rd Generation Partnership Project (3GPP) is currently developing a new access system, which is used for designing a wireless access technology with low complicity and low throughput to meet the needs of the wireless Internet of Things, referred to as the Narrowband-Internet of Things (NB-IoT). The features of this access technology include: supporting large-scale devices with low throughput, low latency sensitivity, ultra-low device cost, ultra-low power consumption, and optimized network architecture.

In NB-IoT, such UE with low throughout, ultra-low device cost, and low power consumption supports only 180 kHz network bandwidth, i.e., a physical resource block in long term evolution (LTE), referred to as a carrier; and the UE needs to support three deployment modes: a stand-alone deployment mode, a guard-band deployment mode, and an in-band deployment mode. The stand-alone mode of operation is to implement NB-IOT on the existing GSM frequency band, i.e., using the operating frequency band of an existing GERAN system and a scattering frequency band potentially deployed by the IOT. The guard-band mode of operation is to implement NB-IOT in the guard band of one LTE carrier, i.e., using a frequency band in the LTE frequency band that is used as the guard band. The in-band mode of operation is to implement NB-IOT in the existing LTE frequency band, i.e., using the frequency band in the LTE frequency band for actual transmission. Different bearer modes may adopt different physical parameters and processing mechanisms.

In Release 13, carriers of NB-IoT are divided into anchor carriers and non-anchor carriers. An anchor carrier is defined as a carrier on which UE considers that NB-IoT related data, such as a physical broadcast channel (PBCH), a primary synchronization signal (PSS)/secondary synchronization signal (SSS), or a system information block (SIB), is to be transmitted; and a non-anchor carrier is defined as a carrier on which UE determines that no NB-IoT related data, such as a PBCH, a PSS, an SSS, or an SIB, is to be transmitted. That is, UE determines that the non-anchor carrier is only used to receive or send NB-IOT related unicast transmitted data, such as a physical downlink control channel (PDCCH), a physical downlink shared channel (PDSCH), or a physical uplink shared channel (PUSCH). When an eNB does not configure a non-anchor carrier for the UE, the anchor carrier may also be used by the UE to receive or send NB-IoT related unicast transmitted data, such as a PDCCH, a PDSCH, or a PUSCH. The eNB may configure a non-anchor carrier for the UE by using a radio resource control (RRC) connection establishment message, an RRC connection reestablishment message, an RRC connection reconfiguration message, an RRC connection recovery message, and the like.

In Release 13 NB-IoT, a paging message is also transmitted only on an anchor carrier; and idle UE receives the paging message on the anchor carrier. An eNB sends paging related configuration (PCCH config) via an SIB, and the UE receives the paging based on the configuration.

In another project eMTC of Release 13, RAN2 introduces a concept of paging narrowband. An eNB may configure a parameter for UE by using a system message; the parameter indicates the number of paging narrowbands. For example, if the parameter is configured to 3, it indicates that narrowband #0, narrowband #1, and narrowband #2 are configured to be paging narrowbands. Based on the parameter, the UE also calculates on which paging narrowband UE receives the paging; the calculation equation is as follows:

$$PNB = \text{floor}(UE\_ID/(N*Ns)) \bmod Nn$$

where $N=\min(T, nB)$, $Ns=\max(1, nB/T)$, and $Nn$ is the number of configured paging narrowbands; $UE\_ID=IMSI \bmod 16384$; $nB$ and $T$ are PCCH parameters configured by using the system information.

RAN #72 meeting has approved a new Release 14 NB-IOT project to enhance the NB-IOT of Release 13, including support for paging on non-anchor carriers. However, no solution is provided in the prior art on how to support paging on non-anchor carriers.

SUMMARY OF INVENTION

In order to resolve the above technical problem, the present invention provides a solution on how to support paging on non-anchor carriers. By adopting the paging carrier configuration scheme provided by the present invention, paging configuration overhead and corresponding UE energy consumption used in receiving are reduced; at the same time, a network side and UE can use correct configuration information to send or receive paging messages on corresponding carriers, thereby enabling sending and reception of paging messages on non-anchor carriers.

According to a first aspect of the present invention, a method for paging performed at user equipment (UE) is provided. The method comprises: receiving, from a base station via a system information block (SIB), paging control channel (PCCH) configuration information for one or a plurality of non-anchor carriers available for receiving a paging message; applying the received PCCH configuration information to the one or plurality of the non-anchor carriers; and receiving a paging message on at least one non-anchor carrier according to PCCH configuration information for the at least one of the one or plurality of the non-anchor carriers.

In an embodiment, the application step comprises: if at least a portion of PCCH configuration information for any one of the one or plurality of the non-anchor carriers is absent, using a portion of PCCH configuration information for an anchor carrier, corresponding to the at least portion absent in the PCCH configuration information for the non-anchor carrier, as the at least portion absent in the PCCH configuration information for the non-anchor carrier, and applying this at least absent portion together with the PCCH configuration information for the non-anchor carrier to the non-anchor carrier.

In an embodiment, the application step comprises: if at least a portion of PCCH configuration information for any one of the one or plurality of the non-anchor carriers is absent, and configured PCCH configuration information for another non-anchor carrier in the one or plurality of the non-anchor carriers is present, using a portion of the PCCH configuration information for the another non-anchor carrier, corresponding to the at least portion absent in the PCCH configuration information for the non-anchor carrier, as the at least portion absent in the PCCH configuration information for the non-anchor carrier, and applying this at least absent portion together with the PCCH configuration information for the non-anchor carrier to the non-anchor carrier.

According to a second aspect of the present invention, a method for paging performed at user equipment (UE) is provided. The method comprises: receiving, from a base station via a system information block (SIB), paging control channel (PCCH) configuration information for an anchor carrier; applying the received PCCH configuration information for the anchor carrier to one or a plurality of non-anchor carriers available for receiving a paging message as PCCH configuration information for the one or plurality of the non-anchor anchors; and receiving a paging message on at least one of the one or plurality of the non-anchor carriers according to the PCCH configuration information for the anchor carrier.

In an embodiment, any one of the methods according to the first and second aspects of the present invention further comprises:

selecting the at least one non-anchor carrier from the one or plurality of the non-anchor carriers according to one of the following:

an enhanced coverage level of the UE;

time windows, wherein different time windows of non-anchor carriers for receiving paging messages are continuous, time-division multiplexed, and non-overlapped; or a UE ID and a carrier sequence.

In an embodiment of any one of the methods according to the first and second aspects of the present invention, non-anchor carrier indication information received from the base station is used to indicate whether a corresponding non-anchor carrier is available for receiving a paging message.

In an embodiment of any one of the methods according to the first and second aspects of the present invention, the non-anchor carrier indication information being used to indicate whether the corresponding non-anchor carrier is available for receiving a paging message is done in the following manners:

non-anchor carrier indication information for each of the one or the plurality of the non-anchor carriers available for receiving a paging message is set to "True," "Setup," or "1"; non-anchor carrier indication information for each of the one or the plurality of the non-anchor carriers not available for receiving a paging message is not set or set to "False," "Release," or "0"; or non-anchor carrier indication information for each of the one or the plurality of the non-anchor carriers available for receiving a paging message is present; otherwise, the non-anchor carrier indication information is absent.

In an embodiment, any one of the methods according to the first and second aspects of the present invention further comprises: receiving, from the base station via an SIB, common first configuration information, wherein the first configuration information at least comprises at least one of information elements downlinkBitmapNonAnchor and DL-GapNoAnchor; and applying the received first configuration information to all the non-anchor carriers so that the first configuration information is used when a paging message is received on the at least one non-anchor carrier.

In an embodiment, any one of the methods according to the first and second aspects of the present invention further comprises: receiving, from the base station via an SIB second configuration information specific to the one or plurality of the non-anchor carriers, wherein the second configuration information at least comprises at least one of information elements DL-carrierFreq, inbandCarrierInfo, and UL-carrierFreq; and applying the received second configuration information to the one or plurality of the non-anchor carriers so that the second configuration information is used when a paging message is received on the at least one non-anchor carrier.

According to a third aspect of the present invention, user equipment (UE) is provided. The UE comprises: a transceiver, configured to receive, from a base station via a system information block (SIB), paging control channel (PCCH) configuration information for one or a plurality of non-anchor carriers available for receiving a paging message; and a configuration unit, configured to apply the received PCCH configuration information to the one or plurality of the non-anchor carriers, wherein the transceiver is further configured to receive a paging message on at least one non-anchor carrier according to PCCH configuration information for the at least one of the one or plurality of the non-anchor carriers.

In an embodiment, the configuration unit is further configured to: if at least a portion of PCCH configuration information for any one of the one or plurality of the non-anchor carriers is absent, use a portion of PCCH configuration information for an anchor carrier, corresponding to the at least portion absent in the PCCH configuration information for the non-anchor carrier, as the at least portion absent in the PCCH configuration information for the non-anchor carrier, and apply the portion of the PCCH configuration information for the anchor carrier together with the PCCH configuration information for the non-anchor carrier to the non-anchor carrier.

In an embodiment, the configuration unit is further configured to: if at least a portion of PCCH configuration information for any one of the one or plurality of the non-anchor carriers is absent, and configured PCCH configuration information for another non-anchor carrier in the one or plurality of the non-anchor carriers is present, use a portion of the PCCH configuration information for the another non-anchor carrier, corresponding to the at least portion absent in the PCCH configuration information for the non-anchor carrier, as the at least portion absent in the PCCH configuration information for the non-anchor carrier, and apply this at least absent portion together with the PCCH configuration information for the non-anchor carrier to the non-anchor carrier.

According to a fourth aspect of the present invention, user equipment (UE) is provided. The UE comprises: a transceiver, configured to receive, from a base station via a system information block (SIB), paging control channel (PCCH) configuration information for an anchor carrier; and a configuration unit, configured to apply the received PCCH configuration information for the anchor carrier to one or a plurality of non-anchor carriers available for receiving a paging message, and use the received PCCH configuration information as PCCH configuration information for the one or plurality of the non-anchor carriers, wherein the transceiver is further configured to receive a paging message on at least one of the one or plurality of the non-anchor carriers according to the PCCH configuration information for the anchor carrier.

In an embodiment, any one of the UE according to the third and fourth aspects of the present invention further comprises: a selection unit, configured to select, according to one of the following, the at least one non-anchor carrier from the one or plurality of the non-anchor carriers available for receiving a paging message that are received from the base station:

an enhanced coverage level of the UE;

time windows, wherein different time windows of non-anchor carriers for receiving paging messages are continuous, time-division multiplexed, and non-overlapped; or a UE ID and a carrier sequence.

In an embodiment of any one of the UE according to the third and fourth aspects of the present invention, non-anchor carrier indication information received from the base station is used to indicate whether a corresponding non-anchor carrier is available for receiving a paging message.

In an embodiment of any one of the UE according to the third and fourth aspects of the present invention, the non-anchor carrier indication information being used to indicate whether the corresponding non-anchor carrier is available for receiving the paging message is done through the following manners:

non-anchor carrier indication information for each of the one or the plurality of the non-anchor carriers available for receiving a paging message is set to "True," "Setup," or "1"; non-anchor carrier indication information for each of the one or the plurality of the non-anchor carriers not available for receiving a paging message is not set or set to "False," "Release," or "0"; or non-anchor carrier indication information for each of the one or plurality of the non-anchor carriers available for receiving a paging message is present; otherwise, the non-anchor carrier indication information is absent.

In an embodiment of any one of the UE according to the third and fourth aspects of the present invention, the transceiver is further configured to receive, from the base station via an SIB, common first configuration information, wherein the first configuration information at least comprises at least one of information elements downlinkBitmapNonAnchor and DL-GapNoAnchor; and the configuration unit is further configured to apply the received first configuration information to all the non-anchor carriers so that the first configuration information is used when a paging message is received on the at least one non-anchor carrier.

In an embodiment of any one of the UE according to the third and fourth aspects of the present invention, the transceiver is further configured to receive, from the base station via an SIB, second configuration information specific to the one or plurality of the non-anchor carriers, wherein the second configuration information at least comprises at least one of information elements DL-carrierFreq, inbandCarrierInfo, and UL-carrierFreq; and the configuration unit is further configured to apply the received second configuration information to the one or plurality of the non-anchor carriers so that the second configuration information is used when a paging message is received on the at least one non-anchor carrier.

According to a fifth aspect of the present invention, a method for paging performed at a base station is provided. The method comprises: configuring paging control channel (PCCH) configuration information for one or a plurality of non-anchor carriers available for sending a paging message; sending to UE via a system information block (SIB) PCCH configuration information for the one or plurality of the non-anchor carriers; and sending a paging message on at least one non-anchor carrier according to PCCH configuration information for the at least one of the one or plurality of the non-anchor carriers.

In an embodiment, at least a portion of PCCH configuration information for any one of the one or plurality of the non-anchor carriers is not configured, so that the UE uses a portion of PCCH configuration information for an anchor carrier, corresponding to the at least portion absent in the PCCH configuration information for the non-anchor carrier, as the at least portion absent in the PCCH configuration information for the non-anchor carrier, and applies this at least absent portion together with the PCCH configuration information for the non-anchor carrier to the non-anchor carrier.

In an embodiment, at least a portion of PCCH configuration information for any one of the one or plurality of the non-anchor carriers is not configured, and PCCH configuration information for another non-anchor carrier in the one or plurality of the non-anchor carriers is configured, so that a portion of the PCCH configuration information for the another non-anchor carrier, corresponding to the at least portion absent in the PCCH configuration information for the non-anchor carrier, is used as the at least portion absent in the PCCH configuration information for the non-anchor carrier, and this at least absent portion together with the PCCH configuration information for the non-anchor carrier is applied to the non-anchor carrier.

According to a sixth aspect of the present invention, a method for paging performed at a base station is provided. The method comprises: sending to user equipment (UE) via a system information block (SIB) paging control channel (PCCH) configuration information for an anchor carrier as PCCH configuration information for one or a plurality of non-anchor carriers available for sending a paging message; and sending a paging message on at least one of the one or plurality of the non-anchor carriers according to the sent PCCH configuration information for the anchor carrier.

In an embodiment, any one of the methods according to the fifth and sixth aspects of the present invention further comprises: selecting the at least one non-anchor carrier from the one or plurality of the non-anchor carriers according to one of the following:

an enhanced coverage level of the UE;

time windows, wherein different time windows of non-anchor carriers for sending paging messages are continuous, time-division multiplexed, and non-overlapped; or a UE ID and a carrier sequence.

In an embodiment of any one of the methods according to the fifth and sixth aspects of the present invention, non-anchor carrier indication information sent to the UE is used to indicate whether a corresponding non-anchor carrier can be used to send a paging message.

In an embodiment of any one of the methods according to the fifth and sixth aspects of the present invention, non-anchor carrier indication information being used to indicate whether the corresponding non-anchor carrier is available for sending a paging message is done through the following manner:

non-anchor carrier indication information for each of the one or the plurality of the non-anchor carriers available for sending a paging message is set to "True," "Setup," or "1"; non-anchor carrier indication information for each of the one or the plurality of the non-anchor carriers not available for receiving a paging message is not set or set to "False," "Release," or "0"; or non-anchor carrier indication information for each of the one or plurality of the non-anchor carriers available for sending a paging message is present; otherwise, the non-anchor carrier indication information is absent.

In an embodiment, any one of the methods according to the fifth and sixth aspects of the present invention further comprises: sending to the UE via an SIB common first configuration information to be applied to all the non-anchor carriers, wherein the first configuration information at least comprises at least one of information elements downlinkBitmapNonAnchor and DL-GapNoAnchor, and is used when a paging message is sent on the at least one non-anchor carrier.

In an embodiment, any one of the methods according to the fifth and sixth aspects of the present invention further comprises: sending to the UE via an SIB specific second configuration information to be applied to the one or plurality of the non-anchor carriers, wherein the second configuration information at least comprises at least one of information elements DL-carrierFreq, inbandCarrierInfo, and UL-carrierFreq, and is used when a paging message is sent on the at least one non-anchor carrier.

According to a seventh aspect of the present invention, a base station is provided. The base station comprises: a configuration unit, configured to configure paging control channel (PCCH) configuration information for one or a plurality of non-anchor carriers available for sending a paging message; and a transceiver, configured to send to user equipment (UE) via a system information block (SIB) the PCCH configuration information for the one or plurality of the non-anchor carriers, and send a paging message on at least one non-anchor carrier according to PCCH configuration information for the at least one of the one or plurality of the non-anchor carriers.

In an embodiment, the configuration unit does not configure at least a portion of PCCH configuration information for any one of the one or plurality of the non-anchor carriers, so that the UE uses a portion of PCCH configuration information for an anchor carrier, corresponding to the at least portion absent in the PCCH configuration information of the non-anchor carrier, as the at least portion absent in the PCCH configuration information of the non-anchor carrier, and applies this at least absent portion together with the PCCH configuration information of the non-anchor carrier to the non-anchor carrier.

In an embodiment, the configuration unit does not configure at least a portion of PCCH configuration information for any one of the one or plurality of the non-anchor carriers, and the configuration unit configures PCCH configuration information for another non-anchor carrier in the one or plurality of the non-anchor carriers, so that a portion of the PCCH configuration information for the another non-anchor carrier, corresponding to the at least portion absent in the PCCH configuration information for the non-anchor carrier, is used as the at least portion absent in the PCCH configuration information for the non-anchor carrier, and this at least absent portion together with the PCCH configuration information for the non-anchor carrier is applied to the non-anchor carrier.

According to an eighth aspect of the present invention, a base station is provided. The base station comprises: a transceiver configured to send to user equipment (UE) via a system information block (SIB) paging control channel (PCCH) configuration information for an anchor carrier as PCCH configuration information for one or a plurality of non-anchor carriers available for sending a paging message, and send a paging message on at least one of the one or plurality of the non-anchor carriers according to the sent PCCH configuration information for the anchor carrier.

In an embodiment, any one of the base stations according to the seventh and eighth aspects of the present invention further comprises: a selection unit, configured to select the at least one non-anchor carrier from the one or plurality of the non-anchor carriers according to one of the following:

an enhanced coverage level of the UE;

time windows, wherein different time windows of non-anchor carriers for sending paging messages are continuous, time-division multiplexed, and non-overlapped; or a UE ID and the order of one or a plurality of non-anchor carriers for receiving a paging message.

In an embodiment of any one of the base stations according to the seventh and eighth aspects of the present invention, non-anchor carrier indication information sent to the UE is used to indicate whether a corresponding non-anchor carrier is available for sending a paging message.

In an embodiment of any one of the base stations according to the seventh and eighth aspects of the present invention, the non-anchor carrier indication information being used to indicate whether the corresponding non-anchor carrier is available for sending a paging message is done through the following manners:

non-anchor carrier indication information for each of the one or the plurality of the non-anchor carriers available for sending a paging message is set to "True," "Setup," or "1";

non-anchor carrier indication information for each of the one or the plurality of the non-anchor carriers not available for receiving a paging message is not set or set to "False," "Release," or "0"; or non-anchor carrier indication information for each of the one or plurality of the non-anchor carriers available for sending a paging message is present; otherwise, the non-anchor carrier indication information is absent.

In an embodiment of any one of the base stations according to the seventh and eighth aspects of the present invention, the transceiver is further configured to: send to user equipment (UE) via an SIB common first configuration information to be applied to all the non-anchor carriers, wherein the first configuration information at least comprises at least one of information elements downlinkBitmapNonAnchor and DL-GapNoAnchor, and is used when a paging message is sent on the at least one non-anchor carrier.

In an embodiment of any one of the base stations according to the seventh and eighth aspects of the present invention, the transceiver is further configured to: send to the UE via an SIB second configuration information specific to the one or plurality of the non-anchor carriers, wherein the second configuration information at least comprises at least one of information elements DL-carrierFreq, inbandCarrierInfo, and UL-carrierFreq, and is used when a paging message is sent on the at least one non-anchor carrier.

With reference to the description and accompanying drawings hereinafter, the specific embodiments of the present invention are described in detail; and the manners in which the principle of the present invention is employed are illustrated. It should be understood that the embodiments of the present invention are not limited in scope. Within the spirit and scope defined by the appended claims, the embodiments of the present invention may include various variations, modifications, and equivalents.

The features described and/or illustrated with respect to a specific embodiment may be used in one or more other embodiments in the same or similar manner, or may be combined with the features in other embodiments, or may be used to replace the features in other embodiments.

It should be particularly noted that the term "comprise/include" used herein in this text refer to the existence of the features, whole pieces, steps or components, but do not exclude the existence or addition of one or more of other features, whole pieces, steps, or components.

BRIEF DESCRIPTION OF DRAWINGS

The above and other features of the present invention will be more pronounced through the following detailed description taken in conjunction with the accompanying drawings.

DETAILED DESCRIPTION OF EMBODIMENTS

With reference to the accompanying drawings, the above described and other features of the present invention would be more pronounced through the description hereinafter. In the description and accompanying drawings, specific embodiments of the present invention are disclosed, and some embodiments that may be implemented based on the principle of the present invention are illustrated. It should be appreciated that the present invention should not be limited to the described embodiments, but include all modifications, variations and equivalents that fall within the scope of the appended claims. In addition, for simplicity, detailed description of the known art not directly related to the present invention is omitted to prevent confusion with respect to the understanding of the present invention.

With reference to the accompanying drawings and specific embodiments, a method for paging according to the present invention is described in detail below.

Multiple embodiments according to the present disclosure are specifically described below with an LTE mobile communications system and its subsequent evolved version as an exemplary application environment, and with NB-IoT as an exemplary implementation scenario. However, it should be understood that the application environment of the present invention is not limited to the above exemplary application environments, but is applicable to other wireless communication systems, such as the future 5G cellular communication system. Moreover, the implementation scenario of the present invention is not limited to NB-IoT, but can also be applied to other non-NB-IoT devices and systems, such as enhanced Machine Type Communication (MTC) scenarios.

Hereinafter, an eNB will be used as an example of a base station for description. It should be understood, however, that the base station in the present invention is not limited thereto, but may also include various base stations such as a macro base station, a micro base station, and a pico base station.

Figure 1:
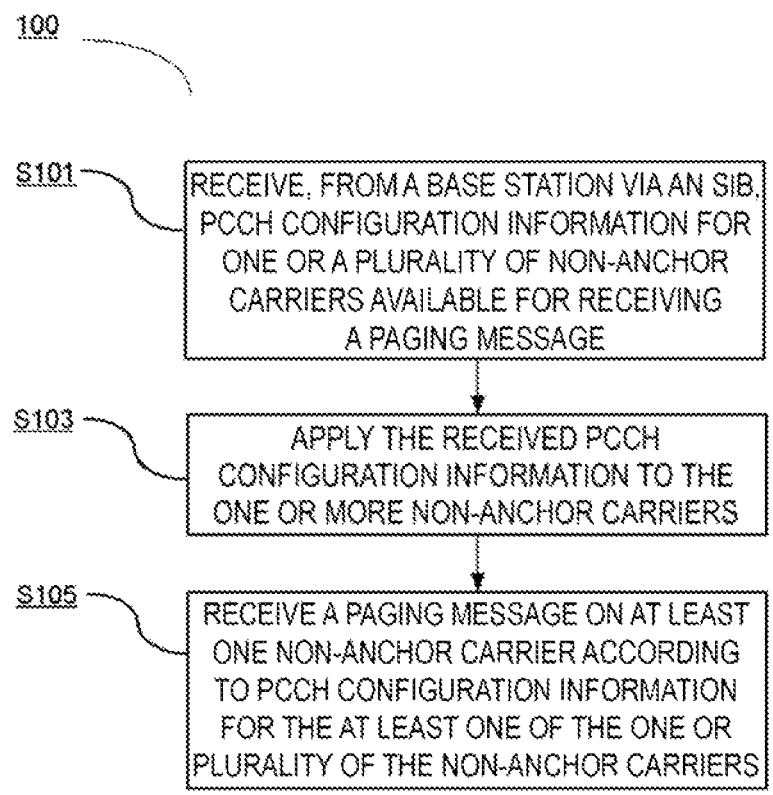
FIG. 1 schematically shows a flowchart of a method for paging performed at UE according to an embodiment of the present invention.

A method for paging performed at UE according to an embodiment of the present invention is described below with reference to FIG. 1. FIG. 1 schematically shows a flowchart of a method 100 for paging performed at UE according to an embodiment of the present invention.

As shown in FIG. 1, in step S101, the UE receives, from an eNB, paging control channel (PCCH) configuration information for one or a plurality of non-anchor carriers available for receiving a paging message, namely, a PCCH-config information element (IE). The PCCH-config IE at least includes a combination of one or a plurality of a default-PagingCycle IE, a npdcch-NumRepetitionPaging IE, and a nB IE.

In this embodiment, the UE receives, via a system information block (SIB), paging control channel (PCCH) configuration information for one or a plurality of non-anchor carriers available for receiving a paging message. More specifically, the UE may receive, via a SystemInformation-NB message, and/or a SystemInformationBlockType2-NB IE in the SystemInformation-NB message, and/or a RadioResourceConfigCommonSIB-NB IE in the SystemInformation-NB message, the PCCH configuration information for the one or plurality of the non-anchor carriers available for receiving a paging message.

In step S103, the UE applies the received PCCH configuration information to the one or plurality of the non-anchor carriers.

In an embodiment, if at least a portion of PCCH configuration information for any one of the one or plurality of the non-anchor carriers is absent, the UE uses a portion of PCCH configuration information for an anchor carrier, corresponding to the at least portion absent in the PCCH configuration information for the non-anchor carrier, as the at least portion absent in the PCCH configuration information for the non-anchor carrier, and applies this at least absent portion together with the PCCH configuration information for the non-anchor carrier to the non-anchor carrier.

For example, if the PCCH-config IE for any one of the one or plurality of the non-anchor carriers is absent or one or a plurality of IEs in the PCCH-config IP are absent, the UE determines that the absent PCCH config IE or the one or more absent IEs in the PCCH-config IE in the non-anchor carrier adopts the same configuration as that of a corresponding PCCH config IE in an anchor carrier or one or a plurality of IEs in the corresponding PCCH-config IE, and applies the configuration together with the PCCH configuration information for the non-anchor carrier to the non-anchor carrier.

In another embodiment, if at least a portion of PCCH configuration information for any one of the one or plurality of the non-anchor carriers is absent, and configured PCCH configuration information for another non-anchor carrier in the one or plurality of the non-anchor carriers is present, a portion of the PCCH configuration information for the another non-anchor carrier, corresponding to the at least portion absent in the PCCH configuration information for the non-anchor carrier, is used as the at least portion absent in the PCCH configuration information for the non-anchor carrier, and the portion of the PCCH configuration information for the another non-anchor carrier together with the PCCH configuration information for the non-anchor carrier is applied to the non-anchor carrier.

For example, if a PCCH-config IE for any one of the one or plurality of the non-anchor carriers is absent or one or a plurality of IEs in the PCCH-config IE is absent, and the UE has been configured with PCCH configuration information for another non-anchor carrier in the one or plurality of the non-anchor carriers in this case, then the UE determines that the absent PCCH config IE or the one or plurality of absent IEs in the PCCH config IE in the non-anchor carrier adopts the same configuration as that of a corresponding PCCH config IE or one or a plurality of IEs in the corresponding PCCH-config IE in the another non-anchor carrier or another non-anchor carrier group, and applies the configuration together with the PCCH configuration information for the non-anchor carrier to the non-anchor carrier. This embodiment is preferably applicable to the case in which the UE receives PCCH configuration information for a plurality of non-anchor carriers, and in which one non-anchor carrier is configured with PCCH configuration information, and the other non-anchor carriers are not configured with PCCH configuration information.

In step S105, the UE receives a paging message on at least one non-anchor carrier according to PCCH configuration information for the at least one of the one or plurality of the non-anchor carriers; that is, the at least one non-anchor carrier is used as a paging carrier. Herein, a paging carrier refers to a carrier transmitting a paging message thereon.

Figure 2:
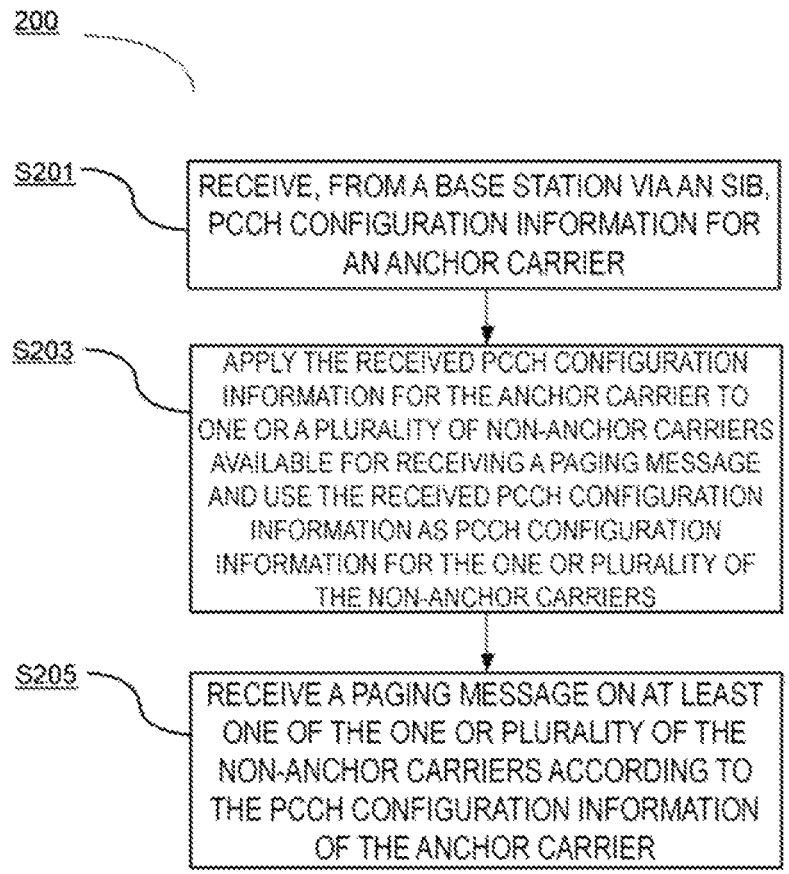
FIG. 2 schematically shows a flowchart of a method for paging performed at UE according to another embodiment of the present invention.

A method for paging performed at UP according to another embodiment of the present invention is described below with reference to FIG. 2. FIG. 2 schematically shows a flowchart of a method 200 for paging performed at UE according to an embodiment of the present invention. In this embodiment, the UE determines that a non-anchor carrier uses the same PCCH configuration as that of an anchor carrier, such as the same PCCH config IE.

As shown in FIG. 2, in step S201, the UE receives PCCH configuration information for an anchor carrier from an eNB. An example is a PCCH config IE for the anchor carrier.

In this embodiment, the UE receives the PCCH configuration information for the anchor carrier via an SIB. More specifically, the UE may receive, via a SystemInformation-NB message, and/or a SystemInformationBlockType2-NB IE in the SystemInformation-NB message, and/or a RadioResourceConfigCommonSIB-NB IE in the SystemInformation-NB message, the PCCH configuration information for the anchor carrier.

In step S203, the UE applies the received PCCH configuration information for the anchor carrier to one or a plurality of non-anchor carriers available for receiving a paging message, and uses the received PCCH configuration information as PCCH configuration information for the one or plurality of the non-anchor carriers.

In step S205, the UE receives a paging message on at least one of the one or plurality of the non-anchor carriers according to the PCCH configuration information for the anchor carrier.

In the present invention, the eNB may configure one or a plurality of non-anchor carriers available for receiving a paging message. Preferably, in consideration of energy consumption of the UE, the UE only needs to receive a paging message on one non-anchor carrier; the eNB also sends a paging message for the UE only on one non-anchor carrier. Therefore, when the eNB configures a plurality of non-anchor carriers available for receiving a paging message, the UE needs to select a non-anchor carrier from the plurality of non-anchor carriers as its paging carrier. It should be understood that in what follows, the technical idea, as an independent technical solution, that the UE needs to select one non-anchor carrier from a plurality of non-anchor carriers as its paging carrier, also falls within the scope of the present invention.

In an embodiment, the UE may select a corresponding non-anchor carrier as a paging carrier according to its own enhanced coverage level (EC level). That is, if the UE determines its EC level to be n, then the UE selects a non-anchor carrier corresponding to EC level n as a paging carrier.

In this embodiment, the UE may receive paging carrier configuration information sent by the eNB, including paging carrier information and/or EC level information, or the like.

The UE may then select a non-anchor carrier to receive a paging message according to the received paging carrier configuration information.

In this embodiment, corresponding paging carriers are configured in different EC levels. For example, if the system supports N EC levels, then the system configures N paging carriers or N groups of paging carriers, with each paging carrier or each group of paging carriers corresponding to one EC level, referred to as a paging resource in the present invention. A corresponding EC level can be explicitly indicated in a configuration of each paging resource; or it could be indicated implicitly; for example, paging resource 0 corresponds to EC level 0, paging resource 1 corresponds to EC level 1, and so on. A condition where a paging resource is satisfied may also be explicitly indicated in a configuration of each paging resource. For example, if RSRP of the UE is greater than or greater than or equal to threshold value 1 and/or less than or less than or equal to threshold value 2, a corresponding paging resource A is to be selected; if the RSRP of the UE is greater than or greater than or equal to threshold value 2 and/or less than or less than or equal to threshold value 3, a corresponding paging resource B is to be selected, and so on.

In another embodiment, the UE may select a non-anchor carrier as a paging carrier according to a time window. That is, paging carriers transmit paging messages in a continuous and time-multiplexed manner.

In this embodiment, the UE receives paging carrier configuration information sent by the eNB, including a paging carrier configuration, a paging receiving time configuration, and the like. The paging receiving time configuration includes a paging carrier cycle and a paging carrier time window.

The UE then selects a non-anchor carrier to receive a paging message according to the received paging carrier configuration information.

For example, if the UE is configured with N paging carriers, and N temporally continuous time windows are included within one paging carrier cycle, then the UE monitors or receives paging in a corresponding paging carrier in each time window. Paging carriers are used in sequence in a predetermined order in time windows of a paging carrier cycle. For example, in the first time window of a paging carrier cycle, the UE determines that a paging carrier is paging carrier M; in the next time window, the UE determines that a paging carrier is paging carrier M+1, and so on.

In still another embodiment, the UE may select a paging carrier according to a UE identifier and the sequence of paging carriers. The UE obtains a paging carrier number according to the following equation:

$$\text{Paging carrier number} = \text{floor}(UE\_ID/(N*Ns)) \bmod Nn,$$
where

UE_ID=IMSI mod X, and N=min(T, nB); Ns=max(1, nB/T); T and nB are PCCH parameters configured in a system message as is the case in the existing mechanism. Nn is the number of paging carriers. In an embodiment, Nn includes the sum of the number of anchor carrier and the number of all non-anchor paging carriers configured in system information. In another embodiment, Nn includes the number of all non-anchor paging carriers configured in system information. In another embodiment, if the eNB configures, by using system information, that both an anchor carrier and a non-anchor carrier can be used for paging transmission, then the UE determines that Nn is the number of paging carriers, including the sum of the number of the anchor carrier and the number of all non-anchor paging carriers configured in the system information; if the eNB configures, by using system information, that paging messages are to be transmitted on only non-anchor carriers, then the UE determines that Nn is the number of paging carriers, indicating the number of all non-anchor paging carriers configured in the system information.

In this embodiment, to which paging carrier the paging carrier number obtained from the above equation corresponds may be determined in a variety of ways as follows.

In implementation 1, in the above equation, Nn represents the number of paging carriers, including the stun of the anchor carrier and the number of all non-anchor paging carriers configured in the system information. The UE determines that the number of the anchor carrier is the smallest, such as 0; and the numbers of the other non-anchor carriers are to be incremental from low to high based on frequencies. That is, for a plurality of configured non-anchor paging carriers with respective carrier frequencies being f Hz, (f+s1) Hz, (f+s2) Hz, . . . , and (S1, S2, . . . , are positive values), their paging carrier numbers are 1 2, 3, . . . . The carrier frequency usually refers to a downlink carrier frequency. In this implementation, if the paging carrier number obtained by the UE by using the above equation is 0, the UE selects the anchor carrier as a paging carrier to receive paging; if the paging carrier number obtained by the UE by using the above equation is 3, the UE selects the non-anchor carrier with the carrier frequency of (f+s2) Hz as a paging carrier to receive paging. This implementation also includes the situation where the UE determines that the number of the anchor carrier is the smallest, such as 0; and the numbers of the other non-anchor carriers are to be incremental from high to low based on frequencies. That is, for a plurality of configured non-anchor paging carriers with respective carrier frequencies being f Hz, (f+s1) Hz, (f+s2) Hz, . . . , and (S1, S2, . . . , are negative values), their paging carrier numbers are 1 2, 3, . . . . In this case, UE paging selection is as described above. Details will not be repeated herein again.

Regarding implementation 2, what differs this implementation from implementation 1 is that the UE determines that the number of the anchor carrier is the largest; that is, it has the largest number in the anchor carrier and all the non-anchor carriers available for receiving paging. Other features are consistent with implementation 1, and will not be described herein again.

Regarding implementation 3, what differs this implementation from implementation 1 is that Nn represents the number of paging carriers, including the number of all non-anchor paging carriers configured in the system information, excluding the anchor carrier. Other features are consistent with implementation 1, and will not be described herein again.

In implementation 4, in the above equation, Nn represents the number of paging carriers, including the sum of the anchor carrier and the number of all non-anchor paging carriers configured in the system information. The UE determines that the number of the anchor carrier is the smallest, such as 0; and the paging carrier numbers of the other non-anchor carriers are ranked from low to high based on the sequence of the non-anchor carriers configured in the system information (paging carrier list). For example, if the non-anchor paging carrier sequence configured in the system information is f1, f2, f3, . . . , then the corresponding paging carrier numbers are 1, 2, 3, . . . ; if the paging carrier number obtained by the UE according to the above equation is 0, then the UE receives paging on the anchor carrier; and if the paging carrier number obtained by the UE according to the equation is 2, then the UE receives paging on the non-anchor carrier corresponding to the carrier frequency of f2. The carrier frequency usually refers to a downlink carrier frequency. This implementation also includes the situation where the UE determines that the number of the anchor carrier is the smallest, such as 0; and the paging carrier numbers of the other non-anchor carriers are ranked from high to low based on the sequence (paging carrier list) in the configured system information. In this case, the UE paging carrier selection is as described above and details will not be repeated herein again.

Regarding implementation 5, what differs this implementation from implementation 4 is that the UE determines that the number of the anchor carrier is the largest; that is, it has the largest number in the anchor carrier and all the non-anchor carriers available for receiving paging. Other features are consistent with implementation 4, and will not be described herein again.

Regarding implementation 6, what differs this implementation from implementation 4 is that Nn represents the number of paging carriers, including the number of all non-anchor paging carriers configured in the system information, excluding the anchor carrier. Other features are consistent with implementation 4, and will not be described herein again.

In implementation 7, Nn represents the number of paging carriers, including the sum of the anchor carrier and the number of all non-anchor paging carriers configured in the system information. The UE determines that the number of the anchor carrier is the smallest, such as 0. The paging carrier numbers of the other non-anchor paging carriers are configured for the UE explicitly by the eNB by using the system information. That is, the UE receives a paging carrier identifier (index or identifier) included in each non-anchor carrier configuration that is sent by using the system information, so as to obtain a paging carrier number corresponding to the non-anchor carrier. If the paging carrier number obtained by the UE according to the equation is X, then the UE receives paging on a non-anchor paging carrier with a paging carrier index configuration of X in the system information.

Regarding implementation 8, what differs this implementation from implementation 7 is that the UE determines that the number of the anchor carrier is the largest; that is, it has the largest number in the anchor carrier and all the non-anchor carriers available for receiving paging. Other features are consistent with implementation 7, and will not be described herein again.

In implementation 9, Nn represents the number of paging carriers, including the number of all non-anchor paging carriers configured in the system information, excluding the anchor carrier. In other words, if the eNB uses the system information and configures for the anchor carrier not transmitting paging, or for paging transmission only occurring on the (configured) non-anchor carriers, the UE determines that that Nn represents the number of paging carriers, including the number of all the non-anchor paging carriers configured in the system information. Other features are consistent with implementation 7, and will not be described herein again.

In implementation 10, Nn represents the number of paging carriers, including the anchor carrier and the number of all non-anchor paging carriers configured in the system information. The UP determines that the number of the anchor carrier is the smallest, such as 0. The paging carrier numbers of the other non-anchor paging carriers are ranked from low to high based on the magnitudes of indexToMidPRB parameters corresponding to the paging carriers configured in the system information from low to high. For example, if the indexTomidpRB parameters corresponding to the non-anchor paging carriers configured in the system information are −30, −2, 14, . . . , then corresponding paging carrier numbers are 1, 2, 3, . . . ; if the paging carrier number obtained by the UE according to the above equation is 0, then the UE receives paging on the anchor carrier; and if the paging carrier number obtained by the UE according to the equation is 2, then the UE receives paging on the non-anchor carrier corresponding to the indexToMidPRB parameter of −2. This implementation also includes the situation where the UE determines that the number of the anchor carrier is the smallest, such as 0; and the paging carrier numbers of the other non-anchor carriers are ranked from low to high based on the magnitudes of corresponding indexToMidPRB parameters of the paging carriers configured in the system information from low to high. In this case, UE paging carrier selection is as described above and will not be described herein again.

Regarding implementation 11, what differs this implementation from implementation 10 is that the UE determines that the number of the anchor carrier is the largest; that is, it has the largest number in the anchor carrier and all the non-anchor carriers available for receiving paging. Other features are consistent with implementation 10, and will not be described herein again.

Regarding implementation 12, what differs this implementation from implementation 10 is that Nn represents the number of paging carriers, including the number of all non-anchor paging carriers configured in the system information, excluding the anchor carrier. Other features are consistent with implementation 10, and will not be described herein again.

In an embodiment, the UE receives configuration information sent by the eNB indicating whether the anchor carrier receives paging on the anchor carrier. If the configuration information indicates that no paging is received on the anchor carrier, then UE determines that the eNB does not send paging on the anchor carrier; that is, the UE receives paging on only non-anchor carriers.

In an embodiment, it is possible to use non-anchor carrier indication information received from the eNB to indicate whether a corresponding non-anchor carrier is a paging carrier, i.e., whether it is available for receiving a paging message.

Specifically, the non-anchor carrier indication information may be used to indicate whether the corresponding non-anchor carrier is available for receiving a paging message in the following manner:

non-anchor carrier indication information for each of the one or the plurality of the non-anchor carriers available for receiving a paging message is set to "True," "Setup," or "1"; non-anchor carrier indication information for each of the one or the plurality of the non-anchor carriers not available for receiving a paging message is not set or set to "False," "Release," or "0"; or non-anchor carrier indication information for each of the one or plurality of the non-anchor carriers available for receiving a paging message is present; otherwise, the non-anchor carrier indication information is absent.

In this embodiment, the UE receives the non-anchor carrier indication information via an SIB. More specifically, the UE may receive, via a SystemInformation-NB message, and/or a SystemInformationBlockType2-NB IE in the SystemInformation-NB message, and/or a RadioResourceConfigCommonSIB-NB IE in the SystemInformation-NB message, the non-anchor carrier indication information.

It should be understood that the above described technical concept of using non-anchor carrier indication information to indicate whether a corresponding non-anchor carrier is available for receiving a paging message, as an independent technical solution, also falls within the scope of the present invention.

In addition to the configuration information described in the above embodiments, in an embodiment, the UE further receives common configuration information from the eNB via an SIB. More specifically, the UE may receive the common configuration information via a SystemInformation-NB message, and/or a SystemInformationBlockType2-NB IE in the SystemInformation-NB message, and/or a RadioResourceConfigCommonSIB-NB IE in the SystemInformation-NB message. The common configuration information includes common configuration information for a plurality of non-anchor carriers, i.e., configuration information shared by multiple non-anchor carriers.

In an embodiment, the common configuration information at least includes at least one of a downlinkBitmapNonAnchor IE and a DL-GapNoAnchor IE, where the downlinkBitmapNonAnchor IE is used to indicate an NB-IoT downlink subframe configuration for downlink transmission on a non-anchor carrier; the DL-GapNoAnchor IE is used to indicate a downlink transmission gap configuration for a non-anchor carrier.

Optionally, the common configuration information may further include an inbandCarrierInfo IE, where the IE includes a configuration for a non-anchor in-band carrier, such as indexToMidPRB, extra NumCRS Ports, and eutraControlRegionSize configurations.

Then, the UE applies the received common configuration information to all the non-anchor carriers so that the common configuration information is used when a paging message is received on the at least one non-anchor carrier. More specifically, all the non-anchor carriers herein refer to all non-anchor carriers except the anchor carrier, or all non-anchor carriers indicated by the carrier-specific configuration information that will be mentioned hereafter.

It should be understood that the technical method of the UE receiving the common configuration information from the eNB via the SIB, as an independent technical solution, also falls within the scope of the present invention.

In another embodiment, the UE also receives, from the eNB via the SIB, carrier-specific configuration information for one or a plurality of non-anchor carriers available for receiving a paging message. More specifically, the UE may receive the carrier-specific configuration information via a SystemInformation-NB message, and/or a SystemInformationBlockType2-NB IE in the SystemInformation-NB message, and/or a RadioResourceConfigCommonSIB-NB IE in the SystemInformation-NB message. The carrier-specific configuration information includes specific configuration information corresponding to a non-anchor carrier, i.e., configuration information corresponding to the non-anchor carrier and is not shared with other non-anchor carriers. In this embodiment, the UE may receive carrier-specific configuration information for one or a plurality of non-anchor carriers from the eNB. That is, the UE may receive a plurality of pieces of carrier-specific configuration information from the eNB, namely, a carrier-specific configuration information list, in which each piece of carrier-specific configuration information corresponds to one non-anchor carrier.

In an embodiment, the carrier-specific configuration information includes a DL carrierFreq IE and/or a UL carrierFreq RRC IE, where the DL carrierFreq IE is used to indicate a downlink carrier frequency of a corresponding non-anchor carrier; and the UL carrierFreq IE is used to indicate an uplink carrier frequency of the corresponding non-anchor carrier.

Optionally, the carrier-specific configuration information may also include an inbandCarrierInfo IE, where the IE includes a configuration for a non-anchor in-band carrier, such as indexToMidPRB, eutra NumCRS Ports, and eutraControlRegionSize configurations.

The UE then applies the received carrier-specific configuration information to the one or plurality of the non-anchor carriers available for receiving a paging signal, so that the carrier-specific configuration information is used when a paging message is received on the at least one non-anchor carrier.

It should be understood that the technical idea, the UE receiving the carrier-specific configuration information from the eNB via an SIB, as an independent technical solution, also falls within the scope of the present invention.

The non-anchor carrier indication information described in the previous embodiments may be included in the carrier-specific configuration information described in this embodiment.

Figure 3:
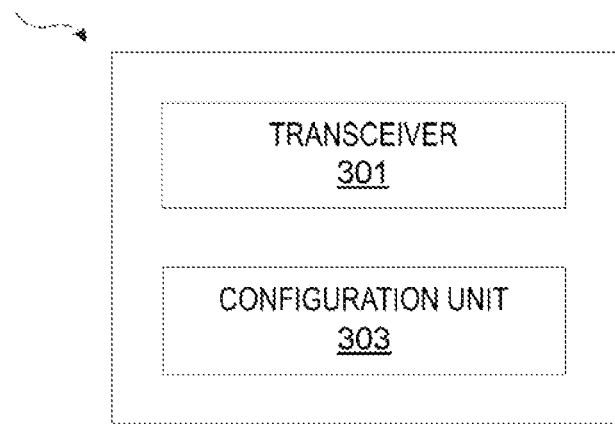
FIG. 3 schematically shows a structural block diagram of UE according to an embodiment of the present invention.

UE according to an embodiment of the present invention will be described below with reference to FIG. 3. FIG. 3 schematically shows a structural block diagram of UE 300 according to an embodiment of the present invention. The UE 300 may perform a method for paging according to an embodiment of the present invention, such as the method 100 shown in FIG. 1 and described in detail earlier.

As shown in FIG. 3, the IE 300 includes: a transceiver 301 and a configuration unit 303. Those skilled in the art should understand that only the transceiver 301 and the configuration unit 303 related to the present invention are shown in the UE 300 of FIG. 3 to avoid obscuring the present invention. However, those skilled in the art should understand that the UE according to the embodiment of the present invention further includes other basic units, although not shown in FIG. 3, form the UE together with other components.

The transceiver 301, in step S101, receives, from a base station via an SIB, PCCH configuration information for one or a plurality of non-anchor carriers available for receiving a paging message.

The configuration unit 303, in step S103, applies the received PCCH configuration information to the one or plurality of the non-anchor carriers.

The transceiver 301, in step S105, receives a paging message on at least one non-anchor carrier according to PCCH configuration information of the at least one of the one or plurality of the non-anchor carriers.

In an embodiment, if at least a portion of PCCH configuration information for any one of the one or plurality of the non-anchor carriers is absent, the configuration unit 303 uses a portion of PCCH configuration information for an anchor carrier, corresponding to the at least portion absent in the PCCH configuration information for the non-anchor carrier, as the at least portion absent in the PCCH configuration information for the non-anchor carrier, and applies this at least absent portion together with the PCCH configuration information for the non-anchor carrier to the non-anchor carrier.

In another embodiment, if at least a portion of PCCH configuration information for any one of the one or plurality of the non-anchor carriers is absent, and if configured PCCH configuration information for another non-anchor carrier in the one or plurality of the non-anchor carriers is present, the configuration unit 303 uses a portion of the PCCH configuration information for the another non-anchor carrier, corresponding to the at least portion absent in the PCCH configuration information for the non-anchor carrier, as the at least portion absent in the PCCH configuration information for the non-anchor carrier, and applies this at least absent portion together with the PCCH configuration information for the non-anchor carrier to the non-anchor carrier.

Figure 4:
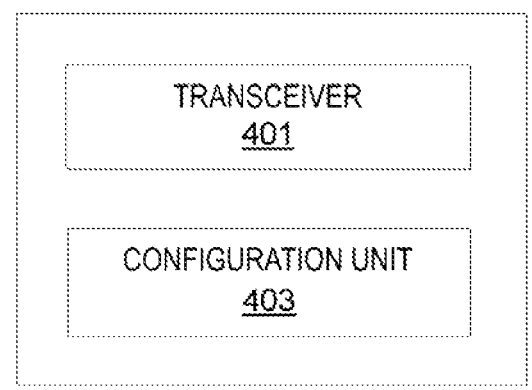
FIG. 4 schematically shows a structural block diagram of UE according to another embodiment of the present invention.

UE according to another embodiment of the present invention will be described below with reference to FIG. 4. FIG. 4 schematically shows a structural block diagram of UE 400 according to an embodiment of the present invention. The UE 400 may perform a method for paging according to an embodiment of the present invention, such as the method 200 shown in FIG. 2 and described in detail earlier.

As shown in FIG. 4, the UE 400 includes: a transceiver 401 and a configuration unit 403. Those skilled in the art should understand that only the transceiver 401 and the configuration unit 403 related to the present invention are shown in the UE 400 of FIG. 4 to avoid obscuring the present invention. However, those skilled in the art should understand that the UE according to the embodiment of the present invention further includes other basic units, although not shown in FIG. 4, form the UE together with other components.

The transceiver 401, in step S201, receives, from a base station via a SIB, PCCH configuration information for one or a plurality of non-anchor carriers available for receiving a paging message.

The configuration unit 403, in step S203, applies the received PCCH configuration information to the one or plurality of the non-anchor carriers.

The transceiver 401, in step S205, receives a paging message on at least one non-anchor carrier according to PCCH configuration information for the at least one of the one or plurality of the non-anchor carriers.

In the present invention, the eNB may configure one or more non-anchor carriers available for receiving a paging message. Preferably, in consideration of energy consumption of the UE, the UE only needs to receive a paging message on one non-anchor carrier; and the eNB also sends a paging message for the UE only on one non-anchor carrier. Therefore, when the eNB configures a plurality of non-anchor carriers available for receiving a paging message, the UE needs to select a non-anchor carrier from the plurality of non-anchor carriers as its paging carrier.

Correspondingly, UEs 300 and 400 may further include a selection unit (not shown), configured to select, according to one of the followings, the at least one non-anchor carrier from the one or plurality of the non-anchor carriers received from the base station and available for receiving a paging message: an enhanced coverage level of the UE; time windows, wherein different time windows of non-anchor carriers for receiving paging messages are continuous, time-division multiplexed, and non-overlapped; or a UE ID and a carrier sequence.

In addition to the configuration information described in the above embodiments, in an embodiment, the transceivers 301 and 401 also receive common first configuration information from the base station via an SIB; the first configuration information includes at least one of information elements downlinkBitmapNonAnchor and DL-GapNoAnchor.

The configuration units 303 and 403 are further configured to apply the received first configuration information to all the non-anchor carriers so that the first configuration information is used when a paging message is received on the at least one non-anchor carrier.

In another embodiment, the transceivers 301 and 401 also receive, from the base station via an SIB, second configuration information specific to the one or plurality of the non-anchor carriers; the second configuration information at least includes at least one of information elements DL-carrierFreq, inbandCarrierInfo, and UL-carrierFreq;

the configuration units 303 and 403 further apply the received second configuration information to the one or plurality of the non-anchor carriers so that the second configuration information is used when a paging message is received on the at least one non-anchor carrier.

Figure 5:
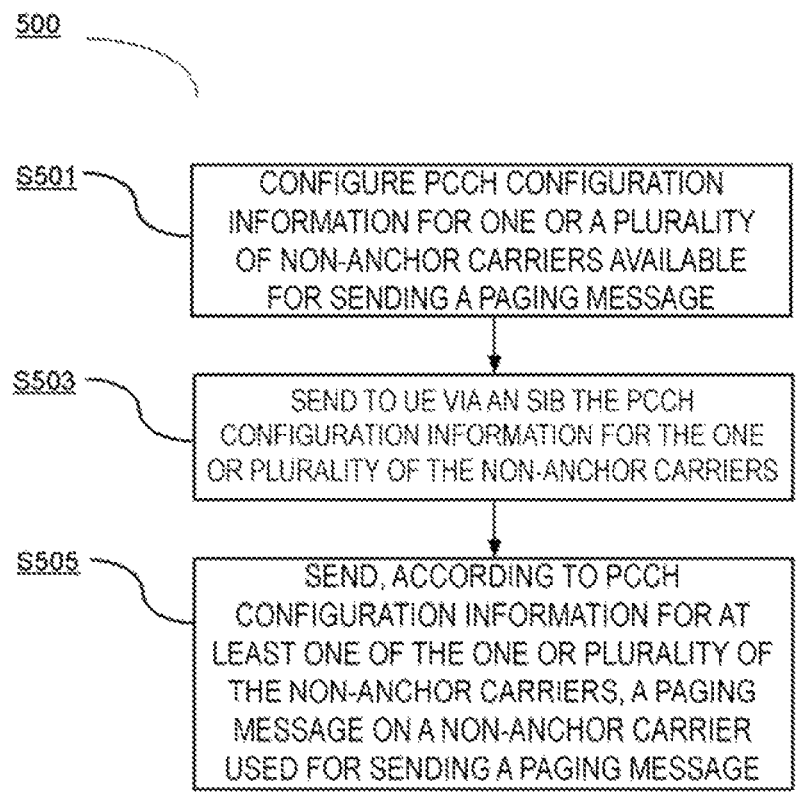
FIG. 5 schematically shows a flowchart of a method for paging performed at a base station according to an embodiment of the present invention.

A method for paging performed at a base station according to an embodiment of the present invention is described below with reference to FIG. 5. FIG. 5 schematically shows a flowchart of a method 500 performed at a base station according to an embodiment of the present invention.

As shown in FIG. 5, in step S501, the eNB configures PCCH configuration information for one or a plurality of non-anchor carriers available for sending a paging message, namely, a PCCH-config information element (IE). The PCCH-config IE at least includes a combination of one or more of a defaultPagingCycle IE, a npdcch-NumRepetition-Paging IE, and a nB IE.

In step S503, the eNB sends to UE the PCCH configuration information for the one or plurality of the non-anchor carriers.

In this embodiment, the eNB sends, via an SIB, the PCCH configuration information for the one or plurality of the non-anchor carriers available for sending a paging message. More specifically, the eNB may send the PCCH configuration information for the one or plurality of the non-anchor carriers available for sending a paging message via a SystemInformation-NB message, and/or a SystemInformationBlockType2-NB IE in the SystemInformation-NB message, and/or a RadioResourceConfigCommonSIB-NB IE in the SystemInformation-NB message.

In an embodiment, at least a portion of PCCH configuration information for any one of the one or plurality of the non-anchor carriers is not configured, so that the UE uses a portion of PCCH configuration information for an anchor carrier, corresponding to the at least portion absent in the PCCH configuration information for the non-anchor carrier, as the at least portion absent in the PCCH configuration information for the non-anchor carrier, and applies this at least absent portion together with the PCCH configuration information for the non-anchor carrier to the non-anchor carrier.

For example, if a PCCH-config IE for any one of the one or plurality of the non-anchor carriers or one or more IEs in the PCCH-config IE are not configured, the UE determines that the unconfigured. PCCH config IE or the one or plurality of unconfigured IEs in the PCCH-config IE in the non-anchor carrier adopts the same configuration as that of a corresponding PCCH config IE or one or a plurality of IEs in the corresponding PCCH-config IE in the anchor carrier, and applies the configuration together with the PCCH configuration information for the non-anchor carrier to the non-anchor carrier.

In another embodiment, if at least a portion of PCCH configuration information for any one of the one or plurality of the non-anchor carriers is not configured, and PCCH configuration information for another non-anchor carrier in the one or plurality of the non-anchor carriers is configured, a portion of the PCCH configuration information for the another non-anchor carrier, corresponding to the at least portion absent in the PCCH configuration information for the non-anchor carrier, is used as the at least portion absent in the PCCH configuration information for the non-anchor carrier, and this at least absent portion together with the PCCH configuration information for the non-anchor carrier is applied to the non-anchor carrier.

For example, if a PCCH-config IE for any one of the one or plurality of the non-anchor carriers is not configured, or one or a plurality of IEs in the PCCH-config IE are not configured, and PCCH configuration information for another non-anchor carrier in the one or plurality of the non-anchor carriers has been configured, the UE determines that the absent PCCH config IE or the one or plurality of the absent IEs in the PCCH config IE in the non-anchor carrier adopts the same configuration as that of a corresponding PCCH config IE or one or a plurality of IEs in the corresponding PCCH-config IE in the another non-anchor carrier or another non-anchor carrier group, and applies the configuration together with the PCCH configuration information for the non-anchor carrier to the non-anchor carrier. This embodiment is preferably applicable to the case where the UE receives PCCH configuration information for a plurality of non-anchor carriers, in which one non-anchor carrier is configured with PCCH configuration information, and the other non-anchor carriers are not configured with PCCH configuration information.

In step S505, the eNB sends a paging message on at least one non-anchor carrier according to PCCH configuration information for the at least one of the one or plurality of the non-anchor carriers; that is, the at least one non-anchor carrier is used as a paging carrier.

Figure 6:
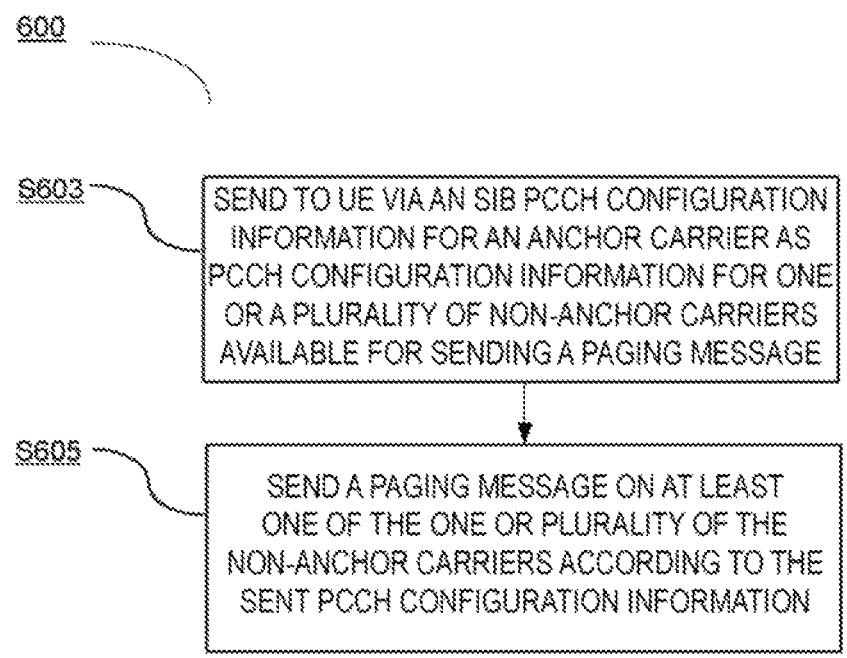
FIG. 6 schematically shows a flowchart of a method for paging performed at a base station according to another embodiment of the present invention.

A method for paging performed at a base station according to another embodiment of the present invention is described below with reference to FIG. 6. FIG. 6 schematically shows a flowchart of a method 600 performed at a base station according to an embodiment of the present invention. In this embodiment, the base station does not configure a PCCH configuration for a non-anchor carrier; thus UE determines that the non-anchor carrier uses the same PCCH configuration, for example, the same PCCH config IE as an anchor carrier.

As shown in FIG. 6, in step S603, the eNB sends to the UE paging control channel (PCCH) configuration information for the anchor carrier, such as a PCCH contig IE for the anchor carrier, and uses it as PCCH configuration information for one or a plurality of non-anchor carriers available for sending a paging message.

In this embodiment, the eNB sends the PCCH configuration information for the anchor carrier via an SIB. More specifically, the eNB may send the PCCH configuration information for the anchor carrier via a System-Information-NB message, and/or a SystemInformationBlockType2-NB IE in the SystemInformation-NB message, and/or a RadioResourceConfigCommonSM-NB IE in the SystemInformation-NB message.

In step S605, the UE receives, according to the PCCH configuration information for the anchor carrier, a paging message on at least one of the one or plurality of the non-anchor carriers.

In the present invention, the eNB may configure one or more non-anchor carriers available for receiving a paging message. Preferably, in consideration of energy consumption of the UE, the UE only needs to receive a paging message on one non-anchor carrier, and the eNB also sends a paging message for the UE only on one non-anchor carrier. Therefore, when the eNB configures a plurality of non-anchor carriers available for receiving a paging message, the UE needs to select a non-anchor carrier from the plurality of non-anchor carriers as its paging carrier. The selection method of eNB is similar to that of the UE, and is only briefly described herein. For details, refer to the corresponding description for the UE.

In an embodiment, the eNB may select a corresponding non-anchor carrier as a paging carrier according to an EC level of the UE. That is, if the eNB determines that the EC level of the UE is n, then the eNB may select a non-anchor carrier corresponding to EC level n as a paging carrier for sending a paging message to the UE.

In this embodiment, the eNB may send paging carrier configuration information to the UE, including paging carrier information and/or EC level information, and the like.

The eNB may then select the corresponding non-anchor carrier to send a paging message according to the EC level of the UE.

In another embodiment, the eNB may select a non-anchor carrier as a paging carrier according to a time window. That is, paging carriers transmit paging messages in a continuous and time-multiplexed manner.

In this embodiment, the eNB sends paging carrier configuration information to the UE, including a paging carrier configuration, a paging receiving time configuration, and the like. The paging receiving time configuration includes a paging carrier cycle and a paging carrier time window.

The eNB may then select a non-anchor carrier to receive a paging message according to the sent configuration information.

For example, if the eNB configures N paging carriers, and N temporally continuous time windows are included within one paging carrier cycle, then the eNB sends paging on a corresponding paging carrier in each time window. Paging carriers are used in sequence in a predetermined order in time windows of a paging carrier cycle. For example, in the first time window of a paging carrier cycle, the eNB uses paging carrier M as a current paging carrier; and in the next time window, the eNB uses paging carrier M+1 as a current paging carrier, and so on.

In still another embodiment, the eNB may select a paging carrier according to a UE identifier and the sequence of paging carriers. The eNB obtains a paging carrier number according to the following equation.

$$\text{Paging carrier number} = \text{floor}(\text{UE\_ID}/(N*Ns)) \bmod Nn,$$

where

UE_ID=IMSI mod X, and Nmin(T, nB); Ns=max(1, nB/T); T and nB are PCCH parameters configured in a system message as is the case in the existing mechanism. Nn is the number of paging carriers. In an embodiment, Nn includes the sum of the number of the anchor carrier and the number of all non-anchor paging carriers configured in system information. In another embodiment, Nn includes the number of all non-anchor paging carriers configured in system information. In another embodiment, if the eNB configures, by using system information, that both an anchor carrier and a non-anchor carrier can be used for paging transmission, then Nn is the number of paging carriers, including the sum of the anchor carrier and the number of all non-anchor paging carriers configured in the system information; if the eNB configures, by using system information, that paging messages are to be transmitted on only non-anchor carriers, then Nn is the number of paging carriers, indicating the number of all non-anchor paging carriers configured in the system information.

In this embodiment, to which paging carrier the paging carrier number obtained from the above equation corresponds may be determined in a variety of ways. For details, see the corresponding description for the UE.

In an embodiment, the eNB sends to the UE configuration information indicating whether paging is to be sent on the anchor carrier.

In another embodiment, the system predefines that no paging is to be sent on the anchor carrier.

In an embodiment, it is possible to use non-anchor carrier indication information sent to the UE to indicate whether a corresponding non-anchor carrier is a paging carrier; that is, whether it is available for receiving a paging message.

Specifically, the non-anchor carrier indication information may be used to indicate whether the corresponding non-anchor carrier is available for receiving a paging message in the following manner:

non-anchor carrier indication information for each of the one or the plurality of the non-anchor carriers available for receiving a paging message is set to "True," "Setup," or "1"; non-anchor carrier indication information for each of the one or the plurality of the non-anchor carriers not available for receiving a paging message is not set or set to "False," "Release," or "0"; or non-anchor carrier indication information for each of the one or plurality of the non-anchor carriers available for receiving a paging message is present; otherwise, the non-anchor carrier indication information is absent.

In this embodiment, the eNB sends the non-anchor carrier indication information via a SIB. More specifically, the UE may send the non-anchor carrier indication information via a SystemInformation-NB message, and/or a SystemInformationBlockType2-NB IE in the SystemInformation-NB message, and/or a RadioResourceConfigCommonSIB-NB IE in the SystemInformation-NB message.

In addition to the configuration information described in the above embodiments, in an embodiment, the eNB further sends common configuration information to the UE via an SIB. More specifically, the eNB may send to the UE the common configuration information via a SystemInformation-NB message, and/or a SystemInformationBlockType2-NB IE in the SystemInformation-NB message, and/or a RadioResourceConfigCommonSIB-NB IE in the SystemInformation-NB message, and use it when a paging message is sent on the at least one non-anchor carrier. The common configuration information includes common configuration information for a plurality of non-anchor carriers, i.e., configuration information shared by multiple non-anchor carriers.

In an embodiment, the common configuration information at least includes at least one of a downlinkBitmapNonAnchor IE and a DL-GapNoAnchor IE, where the downlinkBitmapNonAnchor IE is used to indicate an NB-IoT downlink subframe configuration for downlink transmission on a non-anchor carrier; the DL-GapNoAnchor IE is used to indicate a downlink transmission gap configuration of a non-anchor carrier.

Optionally, the common configuration information may further include an inbandCarrierInfo IE, where the IE includes a configuration for a non-anchor in-band carrier, such as indexToMidPRB, eutra NumCRS Ports, and eutra-ControlRegionSize configurations.

In another embodiment, the eNB also sends to the UE via an SIB carrier-specific configuration information for one or a plurality of non-anchor carriers available for receiving a paging message. More specifically, the eNB may send to the UE the carrier-specific configuration information via a System:Information-NB message, and/or a SystemInformation-BlockType2-NB IE in the SystemInformation-NB message, and/or a RadioResourceConfigCommonSIB-NB IE in the SystemInformation-NB message, and use it when a paging message is sent on the at least one non-anchor carrier. The carrier-specific configuration information includes specific configuration information corresponding to a non-anchor carrier, namely, configuration information corresponding to the non-anchor carrier and is not shared with other non-anchor carriers. In this embodiment, the eNB may send to the UE carrier-specific configuration information for one or a plurality of non-anchor carriers. That is, the eNB may send to the UE a plurality of pieces of carrier-specific configuration information, namely, a carrier-specific configuration information list, in which each piece of carrier-specific configuration information corresponds to one non-anchor carrier.

In an embodiment, the carrier-specific configuration information includes a DL carrierFreq IE and/or a UL carrierFreq RRC IE, where the DL carrierFreq IE is used to indicate a downlink carrier frequency of a corresponding non-anchor carrier; and the UL carrierFreq IE is used to indicate an uplink carrier frequency of the corresponding non-anchor carrier.

Optionally, the carrier-specific configuration information may also include an inbandCarrierInfo IE where the IE includes a configuration for a non-anchor in-band carrier, such as indexToMidPRB, eutra NumCRS Ports, and eutra-ControlRegionSize configurations.

The non-anchor carrier indication information described in the previous embodiments may be included in the carrier-specific configuration information described in this embodiment.

Figure 7:
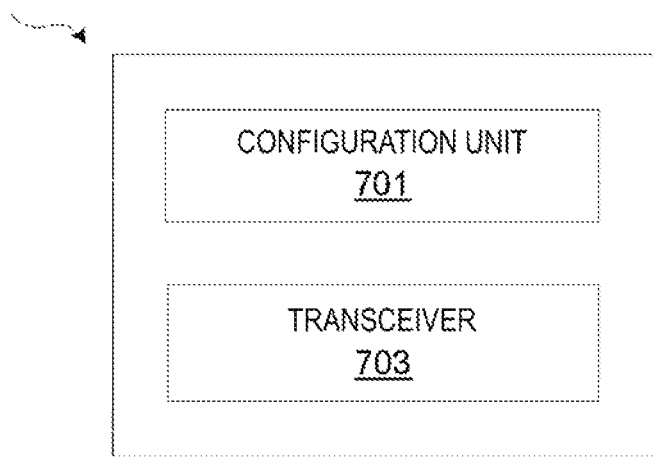
FIG. 7 schematically shows a structural block diagram of a base station according to an embodiment of the present invention.

A base station according to an embodiment of the present invention will be described below with reference to FIG. 7. FIG. 7 schematically shows a structural block diagram of a base station 700 according to an embodiment of the present invention. The base station 700 may perform a method for paging according to an embodiment of the present invention, such as the method 500 shown in FIG. 5 and described in detail earlier.

As shown in FIG. 7, a base station 700 includes a configuration unit 701 and a transceiver 703. Those skilled in the art should understand that only the configuration unit 701 and the transceiver 703 related to the present invention are shown in the base station 700 of FIG. 7 to avoid obscuring the present invention. However, those skilled in the art should understand that the base station according to the embodiment of the present invention further includes other basic units, although not shown in FIG. 7, form the base station together with other components.

The configuration unit 701, in step S501, configures PCCH configuration information for one or a plurality of non-anchor carriers available for sending a paging message.

The transceiver 703, in step S503, sends to UE via an SIB the PCCH configuration information for the one or plurality of the non-anchor carriers, and sends to the UE a paging message on at least one non-anchor carrier according to PCCH configuration information for the at least one of the one or plurality of the non-anchor carriers.

In an embodiment, the configuration unit 701 does not configure at least a portion of PCCH configuration information for any one of the one or plurality of the non-anchor carriers, so that the UE uses a portion of PCCH configuration information for an anchor carrier, corresponding to the at least portion absent in the PCCH configuration information of the non-anchor carrier, as the at least portion absent in the PCCH configuration information of the non-anchor carrier, and applies this at least absent portion together with the PCCH configuration information for the non-anchor carrier to the non-anchor carrier.

In another embodiment, the configuration unit 701 does not configure at least a portion of PCCH configuration information for any one of the one or plurality of the non-anchor carriers, and configures PCCH configuration information for another non-anchor carrier in the one or plurality of the non-anchor carriers, so that a portion of the PCCH configuration information for the another non-anchor carrier, corresponding to the at least portion absent in the PCCH configuration information for the non-anchor carrier, is used as the at least portion absent in the PCCH configuration information for the non-anchor carrier, and this at least absent portion together with the PCCH configuration information for the non-anchor carrier is applied to the non-anchor carrier.

Figure 8:
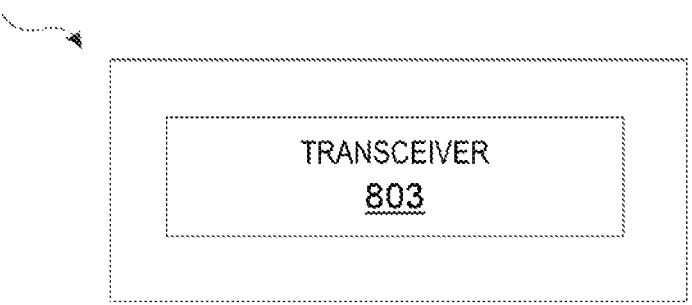
FIG. 8 schematically shows a structural block diagram of a base station according to another embodiment of the present invention.

A base station according to another embodiment of the present invention will be described below with reference to FIG. 8. FIG. 8 schematically shows a structural block diagram of a base station 800 according to another embodiment of the present invention. The base station 800 may perform a method for paging according to an embodiment of the present invention, such as the method 600 shown in FIG. 6 described in detail earlier.

As shown in FIG. 8, the base station 800 includes: a transceiver 803. Those skilled in the art should understand that only the transceiver 803 related to the present invention is shown in the base station 800 of FIG. 8 to avoid obscuring the present invention. However, those skilled in the art should understand that the base station according to the embodiment of the present invention further includes other units, although not shown in FIG. 8, form the base station together with other components.

In this embodiment, the transceiver 803 sends to user equipment (UE) via a system information block (SIB) paging control channel (PCCH) configuration information for an anchor carrier as PCCH configuration information for one or a plurality of non-anchor carriers available for sending a paging message, and sends to the UE a paging message on at least one of the one or plurality of the non-anchor carriers according to the sent PCCH configuration information for the anchor carrier.

In the present invention, the eNB may configure one or a plurality of non-anchor carriers available for receiving a paging message. Preferably, in consideration of energy consumption of the UE, the UE only needs to receive a paging message on one non-anchor carrier; and the eNB also sends a paging message for the UE only on one non-anchor carrier. Therefore, when the eNB configures a plurality of non-anchor carriers available for receiving a paging message, the UE needs to select a non-anchor carrier from the plurality of non-anchor carriers as its paging carrier. The selection method of eNB is similar to that of the UE, and is only briefly described herein. For details, refer to the corresponding description for the UE.

Correspondingly, the base stations 700 and 800 may further include a selection unit (not shown), configured to select the at least one non-anchor carrier from the one or plurality of the non-anchor carriers according to one of the following: an enhanced coverage level of the UE; time windows, wherein different time windows of non-anchor carriers for receiving paging messages are continuous, time-division multiplexed, and non-overlapped; or a UE ID and a carrier sequence.

In addition to the configuration information described in the above embodiments, in an embodiment, the transceivers 703 and 803 further send to the UE via an SIB common first configuration information to be applied to all the non-anchor carriers; the first configuration information at least includes at least one of information elements downlinkBitmap-NonAnchor and DL-GapNoAnchor, and is used when a paging message is sent on the at least one non-anchor carrier.

In another embodiment, the transceivers 703 and 803 further send to the UE via an SIB second configuration information specific to the one or plurality of the non-anchor carriers; the second configuration information at least includes at least one of information elements DL-carrierFreq, inbandCarrierInfo, and UL-carrierFreq, and is used when a paging message is sent on the at least one non-anchor carrier.

In what follows, examples of paging information configuration manners in the present invention are described in combination with the methods used in 3GPP Standard Protocol 36,331.

For example, a new sub-information element carrierConfigCommon-NB is introduced into a RadioResourceConfigCommonSIB-NB IE to include the configuration.

```
RadioResourceConfigCommonSIB-NB-r13 ::= SEQUENCE {
    rach-ConfigCommon-r13           RACH-ConfigCommon-NB-r13,
    bcch-Config-r13                 BCCH-Config-NB-r13,
    pcch-Config-r13                 PCCH-Config-NB-r13,
    nprach-Config-r13               NPRACH-ConfigSIB-NB-r13,
    npdsch-ConfigCommon-r13             NPDSCH-ConfigCommon-NB-r13,
    npusch-ConfigCommon-r13             NPUSCH-ConfigCommon-NB-r13,
    dl-Gap-r13                          DL-GapConfig-NB-r13              OPTIONAL,   --
Need OP
    uplinkPowerControlCommon-r13    UplinkPowerControlCommon-NB-r13,
    carrierConfigCommon-NB-r14        CarrierConfigCommon-NB-r14
    ...
}
```

The following is a format of the IE carrierConfigCommon-NB:

CarrierConfigCommon-NB

The IE CarrierConfigCommon-NB is used to specify a non-anchor carrier in NB-IoT.

CarrierConfigCommon-NB Information Elements

```
-- ASN1START
CarrierConfigCommon-NB-r14 ::=    SEQUENCE {
downlinkBitmapNonAnchor-r13             CHOICE {
        useNoBitmap-r13                         NULL,
        useAnchorBitmap-r13                     NULL,
        explicitBitmapConfiguration-r13         DL-Bitmap-NB-r13,
        spare                                   NULL
    }       OPTIONAL,      -- Need ON
dl-GapNonAnchor-r13                     CHOICE {
        useNoGap-r13                            NULL,
        useAnchorGapConfig-r13                  NULL,
        explicitGapConfiguration-r13            DL-GapConfig-NB-r13,
        spare                                   NULL
    }       OPTIONAL,      -- Need ON
pcch-Config-r13                         PCCH-Config-NB-r13,
nprach-Config-r13                       NPRACH-ConfigSIB-NB-r13,
rach-ConfigCommon-r13                   RACH-ConfigCommon-NB-r13,
CarrierConfigList-NB-r14     SEQUENCE (SIZE(1..maxCarrierConfig-r14)) OF CarrierConfig-r14
carrierConfig-r14            SEQUENCE {
    dl-CarrierFreq-r13                   CarrierFreq-NB-r13,
inbandCarrierInfo-r13          SEQUENCE {
        samePCI-Indicator-r13           CHOICE  {
            samePCI-r13                         SEQUENCE {
                indexToMidPRB-r13               INTEGER (-55..54)
            },
            differentPCI-r13                    SEQUENCE {
                eutra-NumCRS-Ports-r13          ENUMERATED {same, four}
            }
        }                               OPTIONAL,       -- Cond anchor-guardband
        eutraControlRegionSize-r13      ENUMERATED {n1, n2, n3}
    }                                   OPTIONAL,       -- Cond non-anchor-inband
    ...
}
```

```
ul-CarrierFreq-r13      CarrierFreq-NB-r13      OPTIONAL,    -- Need OP
pagingCarrier           ENUMERATED {true}                    OPTIONAL,
randAccessCarrier       ENUMERATED {true}                    OPTIONAL,
    ...
}
}
```

In this embodiment, the UE determines that downlinkBitmapNonAnchor and dl-GapNonAnchor are to be applied to all the non-anchor carriers; the UE determines that pcch-Config is to be applied to all non-anchor paging carriers, and the UE determines that nprach-Config and/or rach-ConfigCommon are to be applied to all non-anchor random access carriers. If these IEs are absent, the UE determines that a non-anchor paging carrier uses the same pcch-config as an anchor carrier. The configuration information contains a list of configuration CarrierConfigList-NB, which contains carrier-specific configuration information for a plurality of carriers. If carrier-specific configuration information carrierConfig in the list contains a pagingCarrier configuration or if the value of the IE is set to "true," the UE determines that the carrier is a paging carrier; that is, the UE determines that paging can be received on the carrier; otherwise, the UE determines that the carrier is not a paging carrier. Similarly, if carrier-specific configuration information carrierConfig in the list contains a randAccessCarrier configuration or if the value of the IE is set to "true," the UE determines that the carrier is a random paging carrier; that is, the UE determines that a random access can be initialized on the carrier; otherwise, the UE determines that the carrier is not a random access carrier.

The following is another format of the IE carrierConfigCommon-NB:
CarrierConfigCommon-NB
IE CarrierConfigCommon-NB is used to specify a non-anchor carrier in NB-IoT.

CarrierConfigCommon-NB Information Elements

```
-- ASN1START
CarrierConfigCommon-NB-r14 ::=    SEQUENCE {
    downlinkBitmapNonAnchor-r13             CHOICE {
        useNoBitmap-r13                         NULL,
        useAnchorBitmap-r13                     NULL,
        explicitBitmapConfiguration-r13         DL-Bitmap-NB-r13,
        spare                                   NULL
    }               OPTIONAL,       -- Need ON
    dl-GapNonAnchor-r13                     CHOICE {
        useNoGap-r13                            NULL,
        useAnchorGapConfig-r13                  NULL,
        explicitGapConfiguration-r13            DL-GapConfig-NB-r13,
        spare                                   NULL
    }               OPTIONAL,       -- Need ON
    CarrierConfigList-NB-r14    SEQUENCE (SIZE(1..maxCarrierConfig-r14)) OF CarrierConfig-r14
    carrierConfig-r14               SEQUENCE {
        dl-CarrierFreq-r13                      CarrierFreq-NB-r13,
        inbandCarrierInfo-r13       SEQUENCE {
            samePCI-Indicator-r13       CHOICE  {
                samePCI-r13                         SEQUENCE {
                    indexToMidPRB-r13                   INTEGER (-55..54)
                },
                differentPCI-r13                    SEQUENCE {
                    eutra-NumCRS-Ports-r13              ENUMERATED {same, four}
                }
            }                           OPTIONAL,       -- Cond anchor-guardband
            eutraControlRegionSize-r13              ENUMERATED {n1, n2, n3}
        }                           OPTIONAL,       -- Cond non-anchor-inband
        ...
    }
    ul-CarrierFreq-r13          CarrierFreq-NB-r13      OPTIONAL,    -- Need OP
    pagingCarrier               ENUMERATED {true}                    OPTIONAL,
    randAccessCarrier           ENUMERATED {true}                    OPTIONAL,
        ...
    }
}
```

The difference between this embodiment and the previous implementation is that pcch-Config, nprach-Config, and rach-ConfigCommo are not included in the IE; and the UE determines that both a non-anchor paging carrier and an anchor carrier adopt the same pcch-config.

In addition, it is possible to use the following method to determine whether a carrier is a paging carrier in addition to the above method of using a pagingCarrier IE.

In an embodiment, configuration is performed by using a bitmap as follows according to the sequence of non-anchor carriers in a CarrierConfigList-NB list. That is, the Mth bit value in the bitmap is set to 1, in which case the UE determines that the 114th non-anchor carrier in the CarrierConfigList-NB list is a paging carrier.

In another embodiment, configuration is performed by using non-anchor serial numbers as follows according to the sequence of non-anchor carriers in a CarrierConfigList-NB list. That is, the value of a paging carrier included in pagingcarrierList is set to n, in which case the UE determines that the Nth non-anchor carrier in the CarrierConfigList-NB list is a paging carrier.

```
pagingcarrierList-NB-r14    SEQUENCE
(SIZE(1..maxpagingcarrier-r14)) OF pagingcarrier-r14
pagingcarrier-r14 ::=                    INTEGER (1..n)
```

In another embodiment of the present invention, if the non-anchor carrier configuration information in broadcast information of the eNB does not include any paging-related configuration information, the UE then determines that this cell does not support paging transmission on non-anchor carriers.

In another embodiment, the UE receives configuration information via a system information block used to indicate whether paging of the cell is transmitted on an anchor carrier or a non-anchor carrier. If it is configured to transmit paging on an anchor carrier, the UE then receives paging only on an anchor carrier; otherwise, if it is configured to transmit on a non-anchor carrier, the UE then receives paging only on a non-anchor carrier.

In another embodiment, the idle UE resides on an anchor carrier. When the UE needs to receive paging, the UE receives paging on a corresponding non-anchor carrier. After the paging reception is completed, the UE returns to the anchor carrier; or if the paging contains a UE identifier of the UE, a random access process is initialized on a corresponding carrier supporting random access.

In the present invention, the eNB may configure one or more non-anchor carriers as paging carriers. In order to reduce signaling overhead of an NB-IoT system, the present invention provides a paging related information configuration method as follows.

The following sections are about a paging configuration and receiving method and apparatus implemented at UE.

In an embodiment, in step a, the UE receives an eNB configured message, including a common part and a carrier-specific part. The common part includes common configuration information for a plurality of non-anchor carriers, namely, configuration information shared by multiple non-anchor carriers; the carrier-specific part includes specific configuration information for each non-anchor carrier, namely, configuration information used for each non-anchor carrier and not shared with other non-anchor carriers.

In this embodiment, the UE receives the configuration information via an SIB, and further, receives the configuration information via a SystemInformation-NB message, and/or a SystemInformationBlockType2-NB IE therein, and/or a RadioResourceConfigCommonSIB-NB IE therein.

Step b: The UE applies or executes the received configuration information.

In an embodiment, the common part may include a downlinkBitmapNonAnchor IE and/or a DL-GapNoAnchor RRC IE. The information element downlinkBitmapNonAnchor is used to indicate an NB-IoT downlink subframe configuration for downlink transmission on a non-anchor carrier; the information element DL-GapNoAnchor is used to indicate a downlink transmission gap configuration for a non-anchor carrier.

This embodiment may be expressed as: in step a', the UE receives, from the eNB, common first configuration information, including information elements downlinkBitmapNonAnchor and/or DL-GapNoAnchor RRC.

Optionally, the first configuration information may further include an inbandCarrierInfo IE, where the IE includes a configuration for a non-anchor in-band carrier, such as indexToMidpRB, eutra NumCRS Ports, and eutraControlRegionSize configurations.

In this embodiment, the UE receives the first configuration information via an SIB, and further, receives the first configuration information via a SystemInformation-NB message, and/or a SystemInformationBlockType2-NB IE in the SystemInformation-NB message, and/or a RadioResourceConfigCommonSIB-NB IE in the SystemInformation-NB message.

Step b': The UE applies or executes the received first configuration information to all the non-anchor carriers.

Furthermore, all the non-anchor carriers refer to all non-anchor carriers other than an anchor carrier, or all non-anchor carriers indicated by the carrier-specific part.

In another embodiment, the carrier-specific part includes a DL carrierFreq IE and/or a UL carrierFreq RRC IE. The information element DL-carrierFreq is used to indicate a downlink carrier frequency of the non-anchor carrier; and the UL carrierFreq IE is used to indicate an uplink carrier frequency of the non-anchor carrier.

This embodiment can be expressed as: in step a", the UE receives, from the eNB, carrier-specific second configuration information, including a DL-carrierFreq IE and/or a UL-carrierFreq RRC IE.

Optionally, the second configuration information may further include an inbandCarrierInfo IE, which includes a non-anchor inband carrier configuration, such as indexToMidPRB, eutra-NumCRS-Ports, and eutraControlRegionSize configurations.

Step b": The UE applies or executes the received configuration information to a corresponding non-anchor carrier.

In this embodiment, the UE may receive, from the eNB, carrier-specific information for one or a plurality of non-anchor carriers. That is, the UE may receive a plurality of pieces of second configuration information from the eNB, namely, a second configuration information list, in which each piece of second configuration information corresponds to one non-anchor carrier.

In this embodiment, the UE receives the second configuration information via a SIB, and further, receives the second configuration information via a SystemInformation-NB message, and/or a SystemInformationBlockType2-NB IE therein, anchor a RadioResourceConfigCommonSIB-NB IE therein.

In another embodiment, in step o, the UP receives non-anchor carrier indication information sent from the eNB; the indication information is used to indicate whether a corresponding non-anchor carrier is a paging carrier, i.e., whether it is available for paging reception and/or sending.

Furthermore, when the value of the indication is set to "true," "setup," or "1," the UE determines that the corresponding non-anchor carrier is a paging carrier; and/or when the value of the indication is set to "false," "release," or "0," or when the indication is absent, the UE determines that the corresponding non-anchor carrier is not a paging carrier.

The indication information described in this embodiment may include the carrier-specific configuration information part in the above embodiment.

In this embodiment, the UE receives the indication information via an SIB, further, receives the indication information via a SystemInformation-NB message, and/or a SystemInformationBlockType2-NB IE in the SystemInformation-NB message, and/or a RadioResourceConfigCommonStB-NB IE in the SystemInformation-NB message.

Optionally, this embodiment includes step q: the UP receives paging on a non-anchor carrier configured as a paging carrier. Alternatively, the UP selects, from all non-anchor carriers configured as paging carriers, a paging carrier to receive paging.

The present invention provides the following embodiments for PCCH configuration of non-anchor carriers.

In an embodiment, step m: the UE determines that a non-anchor carrier uses the same PCCH configuration (PCCH config IE) as that of an anchor carrier.

Optionally, this step further includes the UE receiving, from the eNB, a PCCH configuration for the anchor carrier.

Optionally, in step n, the UE receives paging on a non-anchor carrier according to the PCCH-config for the anchor carrier.

Optionally, this embodiment also includes configuring the non-anchor carrier as a paging carrier; that is, the non-anchor carrier is available for receiving a paging message.

In the present invention, the PCCH config IE includes at least a combination of one or more of defaultPagingCycle, npdcch-NumRepetitionPaging, and nB.

In another embodiment, in step x, the UE receives, from the eNB, a PCCH configuration for a non-anchor carrier.

In this embodiment, the UE receives the PCCH configuration information via an SIB, and further, receives the PCCH configuration information via a SystemInformation-NB message, and/or a SystemInformationBlockType2-NB IE therein, and/or a RadioResourceConfigCommonSIB-NB IE therein.

Step y: The UP applies or executes the received PCCH configuration to the corresponding non-anchor carrier.

Optionally, the method further includes step z: the UE receives a paging message on the corresponding non-anchor carrier according to the received PCCH configuration.

Furthermore, in another embodiment, if a PCCH-config IE of the non-anchor carrier is absent or if one or a plurality of IEs in the PCCH-config are absent, the UE then determines, in terms of the absent PCCH config or the one or plurality of absent IEs therein, that the non-anchor carrier adopts the same configuration as that of the anchor carrier.

In another embodiment, if a PCCH-config IE of the non-anchor carrier is absent or if one or a plurality of IEs in the PCCH-config are absent, and in this case, if the UP is configured with PCCH configuration information applied to another non-anchor carrier or non-anchor carrier group, the UE then determines, in terms of the absent PCCH config or the one or more absent IEs therein, that the non-anchor carrier adopts the same configuration as that of the another non-anchor carrier or the non-anchor carrier group. For example, this embodiment is applicable to the situation where the UE receives a paging configuration for a plurality of non-anchor carriers, in which one non-anchor carrier is configured with PCCH-config, while the other non-anchor carriers are not configured with PCCH-config.

Optionally, this embodiment also includes configuring the non-anchor carrier as a paging carrier; that is, the non-anchor carrier is available for receiving a paging message.

In the present invention, the eNB may configure a plurality of paging carriers. In consideration of energy consumption of the UE, the UP only needs to receive a paging message on one non-anchor carrier; and the eNB also sends a paging message for the UE only on one carrier. In this case, the UE needs to select a paging carrier from the plurality of paging carriers. To resolve the problem, the present invention provides the following method.

In an embodiment, the UP selects a corresponding paging carrier according to its EC level. That is, if the UE determines its EC level to be n, then the UP selects a non-anchor carrier corresponding to EC level n as a paging carrier.

In this embodiment, the method includes step c: the UE receives the paging carrier configuration sent by the eNB; the configuration includes a paging carrier configuration and/or an EC level configuration.

Step d: The UE selects a paging carrier to receive a paging message according to the received configuration information.

In this embodiment, corresponding paging is configured in different EC levels. For example, if the system supports N EC levels, then the system configures N paging carriers or N groups of paging carriers, with each paging carrier or each group of paging carriers corresponding to one EC level, which is called a paging resource in the present invention. A corresponding EC level can be explicitly indicated in a configuration of each paging resource; or it could be indicated implicitly; for example, paging resource 0 corresponds to EC level 0, paging resource 1 corresponds to EC level 1, and so on. A condition where a paging resource is satisfied may also be explicitly indicated in a configuration of each paging resource. For example, if RSRP of the UE is greater than or greater than or equal to threshold value 1 and/or less than or less than or equal to threshold value 2, a corresponding paging resource A is to be selected; if the RSRP of the UE is greater than or greater than or equal to threshold value 2 and/or less than or less than or equal to threshold value 3, a corresponding paging resource B is to be selected, and so on.

In another embodiment, the UE selects a paging carrier according to a time window. That is, paging carriers transmit paging in a continuous and time-multiplexed manner.

In this embodiment, the method includes step c': the UE receives the paging carrier configuration sent by the eNB; the configuration includes a paging carrier configuration, a paging receiving time configuration, and the like. The paging receiving time configuration includes a paging carrier cycle and a paging carrier time window.

Step d': The UE selects a paging carrier to receive a paging message according to the received configuration information.

For example, if the UE is configured with N paging carriers, and N temporally continuous time windows are included within one paging carrier cycle, then the UE monitors or receives paging on a corresponding paging carrier in each time window. Paging carriers are used in sequence in a predetermined order in time windows of a paging carrier cycle. For example, in the first time window of a paging carrier cycle, the UE determines that a paging carrier is paging carrier M; in the next time window, the UE determines that a paging carrier is paging carrier M+1, and so on.

In still another embodiment, the UE may select a paging carrier according to a UE identifier and the order of paging carriers. The UE obtains a paging carrier number according to the following equation.

$$\text{Paging carrier number} = \text{floor}(UE\_ID/(N*Ns)) \bmod Nn,$$
where $UE\_ID=IMSI \bmod X$, and $N=\min(T, nB)$; $Ns=\max(1, nB/T)$; T and nB are PCCH parameters configured in a system message as is the case in the existing mechanism. Nn is the number of paging carriers. In an embodiment, Nn includes the sum of the number of the anchor carrier and the number of all non-anchor paging carriers configured in system information. In another embodiment, Nn includes the number of all non-anchor paging carriers configured in system information. In another embodiment, if the eNB configures, by using system information, that both an anchor carrier and a non-anchor carrier can be used for paging transmission, then the UE determines that Nn is the number of paging carriers, including the sum of the number of the anchor carrier and the number of all non-anchor paging carriers configured in the system information; if the eNB configures, by using system information, that paging messages are to be transmitted only on non-anchor carriers, then the UE determines that Nn is the number of paging carriers, indicating the number of all non-anchor paging carriers configured in the system information.

In this embodiment, to which paging carrier the paging carrier number obtained from the above equation corresponds may be determined in a variety of ways as follows.

In implementation 1, in the above equation, Nn represents the number of paging carriers, including the sum of the anchor carrier and the number of all non-anchor paging carriers configured in the system information. The UE determines that the number of the anchor carrier is the smallest, such as 0; and the numbers of the other non-anchor carriers are to be incremental from low to high by frequencies. That is, for a plurality of configured non-anchor paging carriers with respective carrier frequencies of f Hz, (f+s1) Hz, (f+s2) Hz, . . . , and (S1, S2, . . . are positive values), their paging carrier numbers are 1 2, 3, . . . . The carrier frequency usually refers to a downlink carrier frequency. In this implementation, if the paging carrier number obtained by the UE by using the above equation is 0, the UE selects the anchor carrier as a paging carrier to receive paging; if the paging carrier number obtained by the UE by using the above equation is 3, the UE selects the non-anchor carrier with the carrier frequency of (f+s2) Hz as a paging carrier to receive paging. This implementation also includes the situation where the UE determines that the number of the anchor carrier is the smallest, such as 0; and the numbers of the other non-anchor carriers are to be incremental from high to low by frequencies; that is, for a plurality of configured non-anchor paging carriers with respective carrier frequencies of f Hz, (f+s1) Hz, (f+s2) Hz, . . . , and (S1, S2, . . . are negative values), their paging carrier numbers are 1 2, 3, . . . . In this case, UE paging carrier selection is as described above and will not be described herein again.

Regarding implementation 2, what differs this implementation from implementation 1 is that the UE determines that the number of the anchor carrier is the largest; that is, it has the largest number in the anchor carrier and all the non-anchor carriers available for receiving paging. Other features are consistent with implementation 1, and will not be described herein again.

Regarding implementation 3, what differs this implementation from implementation 1 is that Nn represents the number of paging carriers, including the number of all non-anchor paging carriers configured in the system information, excluding the anchor carrier. Other features are consistent with implementation 1, and will not be described herein again.

In implementation 4, in the above equation, Nn represents the number of paging carriers, including the sum of the number of the anchor carrier and the number of all non-anchor paging carriers configured in the system information. The UE determines that the number of the anchor carrier is the smallest, such as 0; and the paging carrier numbers of the other non-anchor carriers are ranked from low to high based on the sequence of the non-anchor carriers configured in the system information (paging carrier list). For example, if the non-anchor paging carrier sequence configured in the system information is f1, f2, f3, . . . , then the corresponding paging carrier numbers are 1, 2, 3, . . . ; if the paging carrier number obtained by the UE according to the above equation is 0, then the UE receives paging on the anchor carrier; and if the paging carrier number obtained by the UE according to the equation is 2, then the UE receives paging on the non-anchor carrier corresponding to the carrier frequency of f2. The carrier frequency usually refers to a downlink carrier frequency. This implementation also includes the situation where the UE determines that the number of the anchor carrier is the smallest, such as 0; and the paging carrier numbers of the other non-anchor carriers are ranked from high to low based on the sequence (paging carrier list) in the configured system information. In this case, the UE paging carrier selection is as described above and will not be described herein again.

Regarding implementation 5, what differs this implementation from implementation 4 is that the UE determines that the number of the anchor carrier is the largest; that is, it has the largest number in the anchor carrier and all the non-anchor carriers available for receiving paging. Other features are consistent with implementation 4, and will not be described herein again.

Regarding implementation 6, what differs this implementation from implementation 4 is that Nn represents the number of paging carriers, including the number of all non-anchor paging carriers configured in the system information, excluding the anchor carrier. Other features are consistent with implementation 4, and will not be described herein again.

In implementation 7, Nn represents the number of paging carriers, including the sum of the number of the anchor carrier and the number of all non-anchor paging carriers configured in the system information. The UE determines that the number of the anchor carrier is the smallest, such as 0. The paging carrier numbers of the other non-anchor paging carriers are configured explicitly for the UE, by the eNB by using the system information. That is, the UE receives a paging carrier identifier (index or identifier) included in each non-anchor carrier configuration sent by using the system information, so as to obtain a paging carrier number corresponding to the non-anchor carrier. If the paging carrier number obtained by the UE according to the equation is X, then the UE receives paging on a non-anchor paging carrier with a paging carrier index configuration of X in the system information.

Regarding implementation 8, what differs this implementation from implementation 7 is that the UE determines that the number of the anchor carrier is the largest; that is, it has the largest number in the anchor carrier and all the non-anchor carriers available for receiving paging. Other features are consistent with implementation 7, and will not be described herein again.

In implementation 9, Nn represents the number of paging carriers, including the number of all non-anchor paging carriers configured in the system information, excluding the anchor carrier. In other words, if the eNB configures, by using the system information, that the anchor carrier transmits no paging, or paging transmission only occurs on the (configured) non-anchor carriers, the UP determines that Nn represents the number of paging carriers, including the number of all the non-anchor paging carriers configured in the system information. Other features are consistent with implementation 7, and will not be described herein again.

In implementation 10, Nn represents the number of paging carriers, including the anchor carrier and the number of all non-anchor paging carriers configured in the system information. The UE determines that the number of the anchor carrier is the smallest, such as 0. The paging carrier numbers of the other non-anchor paging carriers are ranked from low to high based on the magnitudes of indexToMidPRB parameters corresponding to the paging carriers configured in the system information from low to high. For example, if the indexTomidpRB parameters corresponding to the non-anchor paging carriers configured in the system information are −30, −2, 14, . . . , then corresponding paging carrier numbers are 1, 2, 3, . . . ; if the paging carrier number obtained by the UE according to the above equation is 0, then the UE receives paging on the anchor carrier; and if the paging carrier number obtained by the UP according to the equation is 2, then the UE receives paging on the non-anchor carrier corresponding to the indexToMidPRB parameter of −2. This implementation also includes the situation where the UE determines that the number of the anchor carrier is the smallest, such as 0; and the paging carrier numbers of the other non-anchor carriers are ranked from low to high based on the magnitudes of corresponding indexToMidPRB parameters of the paging carriers configured in the system information from low to high. In this case, UE paging carrier selection is as described above and will not be described herein again.

Regarding implementation 11, what differs this implementation from implementation 10 is that the UE determines that the number of the anchor carrier is the largest; that is, it has the largest number in the anchor carrier and all the non-anchor carriers available for receiving paging. Other features are consistent with implementation 10, and will not be described herein again.

Regarding implementation 12, what differs this implementation from implementation 10 is that Nn represents the number of paging carriers, including the number of all non-anchor paging carriers configured in the system information, excluding the anchor carrier. Other features are consistent with implementation 10, and will not be described herein again.

In an embodiment, the UE receives configuration information sent by the eNB indicating whether the anchor carrier receives paging on the anchor carrier. If the configuration information indicates that no paging is received on the anchor carrier, then UE determines that the eNB does not send paging on the anchor carrier; that is, the UE receives paging on only non-anchor carriers.

The following section describes a related paging configuration and sending method and apparatus that are implemented on an eNB.

In an embodiment, in step k, the eNB sends to UE a configuration message, including a common part and a carrier-specific part. The common part includes common configuration information for a plurality of non-anchor carriers, namely, configuration information shared by the plurality of non-anchor carriers; the carrier-specific part includes specific configuration information for each non-anchor carrier, namely, configuration information used for each non-anchor carrier and not shared with other non-anchor carriers.

In this embodiment, the configuration information is sent by the eNB via an SIB; and further, the configuration information is sent by the eNB via a SystemInformation-NB message, and/or a SystemInformationBlockType2-NB IE therein, and/or a RadioResourceConfigCommonSIB-NB IE therein.

In an embodiment, the common part may include information elements (IEs) downlinkBitmapNonAnchor and/or DL-GapNoAnchor RRC. The information element downlinkBitmapNonAnchor is used to indicate an NB-IoT downlink subframe configuration for downlink transmission on a non-anchor carrier; the information element DL-GapNoAnchor is used to indicate a downlink transmission gap configuration for a non-anchor carrier.

This embodiment can be expressed as: in step k', the eNB sends to the UE common first configuration information, including information elements downlinkBitmapNonAnchor and/or DL-GapNoAnchor RRC.

Optionally, the first configuration information may further include an inbandCarrierInfo IE; the IE includes a configuration for a non-anchor in-band carrier, such as indexToMidPRB, eutra NumCRS Ports, and eutraControlRegionSize configurations.

In this embodiment, the first configuration information is sent by the eNB via an SIB; and further, the first configuration information is sent by the eNB via a SystemInformation-NB message, and/or a SystemInformationBlockType2-NB IE in the SystemInformation-NB message, and/or a RadioResourceConfigCommonSIB-NB IE in the SystemInformation-NB message.

Furthermore, all the non-anchor carriers refer to all non-anchor carriers other than an anchor carriers, or all non-anchor carriers indicated by the carrier-specific part.

In another embodiment, the carrier-specific part includes a DL carrierFreq IE and/or a UL carrierFreq RRC IE. The information element DL-carrierFreq is used to indicate a downlink carrier frequency of the non-anchor carrier; and the UL carrierFreq IE is used to indicate an uplink carrier frequency of the non-anchor carrier.

This embodiment can be expressed as: in step k", the eNB sends to the UE carrier-specific second configuration information, including a DL-carrierFreq IE and/or a UL-carrierFreq RRC IE.

Optionally, the second configuration information may further include an inbandCarrierInfo IE, which includes a non-anchor inband carrier configuration, such as indexToMidPRB, eutra-NtnCRS-Ports, and eutraControlRegionSize configurations.

In this embodiment, carrier-specific information for one or a plurality of non-anchor carriers is sent by the eNB. That is, the eNB sends multiple pieces of second configuration information, namely, a second configuration information list, in which each piece of second configuration information corresponds to one non-anchor carrier.

In this embodiment, the second configuration information is sent by the eNB via an SIB; and further, the second configuration information is sent by the eNB via a SystemInformation-NB message, and/or a System informationBlockType2-NB IE therein, and/or a RadioResourceConfigCommonSIB-NB IE therein.

In another embodiment, in step e, the eNB sends non-anchor carrier indication information to the UE that is used to indicate whether a corresponding non-anchor carrier is a paging carrier, that is, whether it is available for paging reception and/or sending.

Furthermore, when a non-anchor carrier is a paging carrier, the eNB sets the value of the indication to "true" or "setup" or "1"; and/or when the corresponding non-anchor carrier is not a paging carrier, the eNB sets the value of the indication to "false" or "release" or "0", or the indication is absent.

The indication information described in this embodiment may include the carrier-specific configuration information part in the above embodiment.

In this embodiment, the indication information is sent by the eNB via an SIB; and further, the indication information is sent by the eNB via a SystemInformation-NB message, and/or a System informationBlockType2-NB IE in the SystemInformation-NB message, and/or a RadioResourceConfigCommonSIB-NB IE in the SystemInformation-NB message.

Optionally, in this embodiment, in step f, the eNB sends paging on a non-anchor carrier configured as a paging carrier.

The present invention provides the following embodiments for paging control channel (PCCH) configuration of non-anchor carriers.

In an embodiment, in step I, the eNB adopts the same PCCH configuration (PCCH-config IE) as that of an anchor carrier for a non-anchor carrier.

Optionally, this step further includes the eNB sending the PCCH configuration of the anchor carrier to the UE.

Optionally, in step j, the eNB sends paging on a non-anchor carrier according to the PCCH config of the anchor carrier.

Optionally, this embodiment also includes configuring the non-anchor carrier as a paging carrier, that is, it is available for sending paging.

In another embodiment, in step m, the eNB sends a PCCH configuration (PCCH config) for a non-anchor carrier to the UE.

In this embodiment, the PCCH configuration information is sent by the eNB via an SIB; and further, the PCCH configuration information is sent by the eNB via a SystemInformation-NB message, and/or a SystemInformationBlockType2-NB IE in the SystemInformation-NB message, and/or a RadioResourceConfigCommonSIB-NB IE in the SystemInformation-NB message.

Optionally, the method further includes step n: the eNB sends a paging message on the corresponding non-anchor carrier according to the configured PCCH configuration.

Furthermore, in another embodiment, if the eNB desires to configure the non-anchor carrier to use the same PCCH configuration as the anchor carrier, then the eNB may configure a PCCH-config IE of the non-anchor carrier to be absent or one or a plurality of IEs in the PCCH-config to be absent.

In another embodiment, if the eNB desires to configure the non-anchor carrier to use the same PCCH configuration as another certain non-anchor carrier, then the eNB configures the PCCH-config IE of the non-anchor carrier to be absent or one or a plurality of IEs in the PCCH-config to be absent, and configures a PCCH for the another non-anchor carrier.

Optionally, this embodiment also includes configuring the non-anchor carrier as a paging carrier; that is, it is available for sending a paging message.

In the present invention, the eNB may configure a plurality of paging carriers. In consideration of energy consumption of the UE, the UE only needs to receive a paging message on one non-anchor carrier; and the eNB also sends a paging message for the UE only on one carrier. In this case, the UE needs to select a paging carrier from the plurality of paging carriers. To resolve the problem, the present invention provides the following method.

In an embodiment, the eNB selects a corresponding paging carrier according to an EC level of the UE. That is, if the eNB determines that the EC level of the UE is n, the eNB selects a paging carrier corresponding to EC level n for sending paging to the UE.

This embodiment includes step u: the eNB sends to the UE the paging carrier configuration, including a paging carrier configuration and/or an EC level configuration.

Step v: The eNB selects a corresponding paging carrier to send paging according to the EC level of the UP.

In this embodiment, corresponding paging is configured at different EC levels. For example, if the system supports N EC levels, then the system configures N paging carriers or N groups of paging carriers, with each paging carrier or each group of paging carriers corresponding to one EC level, which is referred to as a paging resource in the present invention. A corresponding EC level can be explicitly indicated in a configuration of each paging resource; or it can be indicated in an implicit manner; for example, paging resource 0 corresponds to EC level 0, paging resource 1 corresponds to EC level 1, and so on. A condition where a paging resource is satisfied may also be explicitly indicated in a configuration of each paging resource. For example, if RSRP of the UE is greater than or greater than or equal to threshold value 1 and/or less than or less than or equal to threshold value 2, a corresponding paging resource A is to be selected; if the RSRP of the UE is greater than or greater than or equal to threshold value 2 and/or less than or less than or equal to threshold value 3, a corresponding paging resource B is to be selected, and so on.

In another embodiment, the eNB selects a paging carrier according to a time window. That is, paging carriers transmit paging in a continuous and time-multiplexed manner.

This embodiment includes step p: the eNB sends to the UE the paging carrier configuration, including a paging carrier configuration, a paging receiving time configuration, and the like. The paging receiving time configuration includes a paging carrier cycle and a paging carrier time window.

Step q: The eNB selects a paging carrier to send paging according to the sent configuration information.

For example, if the eNB configures N paging carriers, and N temporally continuous time windows are included within one paging carrier cycle, then the eNB sends paging on a corresponding paging carrier in each time window. Paging carriers are used in sequence in a predetermined order in time windows of a paging carrier cycle. For example, in the first time window of a paging carrier cycle, the eNB uses paging carrier M as a current paging carrier; and in the next time window, the eNB uses paging carrier M+1 as a current paging carrier, and so on.

In another embodiment, the eNB sends to the UE configuration information indicating whether paging is to be sent on the anchor carrier.

In another embodiment, the system predefines that no paging is to be sent on the anchor carrier.

In still another embodiment, the eNB may select a paging carrier according to a UE identifier and the sequence of paging carriers. The eNB obtains a paging carrier number according to the following equation.

Paging carrier number=floor(UE_ID($N*Ns$))mod $Nn$, where

UE_IDIMSI mod X, and Nmin(T, nB); Ns=max(1, nB/T); T and nB are PCCH parameters configured in a system message as is the case in the existing mechanism. Nn is the number of paging carriers. In an embodiment, Nn includes the sum of the number of the anchor carrier and the number of all non-anchor paging carriers configured in system information. In another embodiment, Nn includes the number of all non-anchor paging carriers configured in system information. In another embodiment, if the eNB configures, by using system information, that both an anchor carrier and a non-anchor carrier can be used for paging transmission, then Nn is the number of paging carriers, including the sum of the number of the anchor carrier and the number of all non-anchor paging carriers configured in the system information; if the eNB configures, by using system information, that paging messages are to be transmitted on only non-anchor carriers, then Nn is the number of paging carriers, indicating the number of all non-anchor paging carriers configured in the system information.

Specific implementations of the present invention are described in detail above with reference to the accompanying drawings, illustrating manners in which the principle of the present invention can be employed. It should be understood that the embodiments of the present invention are not limited in scope. Within the spirit and scope defined by the appended claims, the embodiments of the present invention may include various variations, modifications, and equivalents.

The features described and/or illustrated with respect to a specific embodiment may be used in one or more other embodiments in the same or similar manner, or may be combined with the features in other embodiments, or may be used to replace the features in other embodiments.

It should be particularly noted that the term "comprise/include" used herein in this text refer to the existence of the features, whole pieces, steps, or components, but do not exclude the existence or addition of one or more of other features, whole pieces, steps, or components.

The program running on the device according to the present invention may be a program that enables the computer to implement the functions of the embodiments of the present invention by controlling the central processing unit (CPU). The program or information processed by the program can be stored temporarily in volatile memory (e.g., random access memory RAM), hard disk drive (I-IDD), non-volatile memory (e.g., flash memory), or other memory systems.

The program for implementing the functions of the embodiments of the present invention may be recorded on a computer-readable recording medium. The corresponding functions can be achieved by reading programs recorded on the recording medium and executing them by the computer system. The so-called "computer system" may be a computer system embedded in the device, which may include operating systems or hardware (e.g., peripherals). The "computer-readable recording medium" may be a recording medium for a semiconductor recording medium, an optical recording medium, a magnetic recording medium, a short-time dynamic memory program, or any other recording medium readable by a computer.

Various features or functional modules of the device used in the above embodiments may be implemented or executed by circuits (e.g., monolithic or multi-piece integrated circuits). Circuits designed to execute the functions described in this description may include general purpose processors, digital signal processors (DSPs), application specific integrated circuits (ASICs), field programmable gate arrays (FPGAs) or other programmable logic devices, discrete gates or transistor logic, or discrete hardware components, or any combination of the above. The general-purpose processor may be a microprocessor, or may be any existing processor, a controller, a microcontroller, or a state machine. The circuit may be a digital circuit or an analog circuit. When new integrated circuit technologies that replace existing integrated circuits emerge because of advances in semiconductor technology, one or more embodiments of the present invention may also be implemented by using these new integrated circuit technologies.

Furthermore, the present invention is not limited to the embodiments described above. Although various examples of the described embodiments have been described, the present invention is not limited thereto. Fixed or non-mobile electronic devices installed indoors or outdoors, such as AV equipment, kitchen equipment, cleaning equipment, air conditioner, office equipment, vending machines, and other household appliances, may be used as terminal devices or communications devices.

The embodiments of the present invention have been described in detail above with reference to the accompanying drawings. However, the specific structures are not limited to the above embodiments, and the present invention also includes any design modifications that do not depart from the main idea of the present invention. In addition, various modifications can be made to the present invention within the scope of the claims, and embodiments resulting from the appropriate combination of the technical means disclosed in different embodiments are also included within the technical scope of the present invention. In addition, components with the same effect described in the above embodiments may be replaced with one another,

The invention claimed is:

1. A method for paging, performed by User equipment (UE), comprising:
receiving, from a base station via a system information block (SIB), information related to paging message reception for a plurality of carriers;
applying the information related to paging message reception to the plurality of carriers;
determining one of the plurality of carriers based on the information related to paging message reception, wherein
an npdcch-NumRepetitionPaging information element is included in the information related to paging message reception,
said method further comprising:
receiving, from the base station via the SIB, another information related to paging message reception which does not include the npdcch-NumRepetitionPaging information element for a carrier; and
applying, to the carrier, the npdcch-NumRepetitionPaging configured in SystemInformationBlockType2-NB, in a case that the other information related to paging message reception is received.

2. User equipment (UE), comprising:
a transceiver circuitry, configured to receive, from a base station via a system information block (SIB), information related to paging message reception for a plurality of carriers;
a configuration circuitry, configured to apply the information related to paging message reception to the plurality of carriers, wherein
a selection circuitry is configured to determine one of the plurality of carriers based on the information related to paging message reception, and wherein
an npdcch-NumRepetitionPaging information element is included in the information related to paging message reception,
the transceiver circuitry configured to receive, from the base station via the SIB, another information related to paging message reception which does not include the npdcch-NumRepetitionPaging information element for a carrier; and
the configuration circuitry configured to apply to the carrier, the npdcch-NumRepetitionPaging configured in SystemInformationBlockType2-NB, in a case that the other information related to paging message reception is received.

3. A method for paging performed by a base station, comprising:
transmitting to User equipment (UE) via a system information block (SIB), information related to paging message reception for a plurality of carriers which is applied by a user equipment to the plurality of carriers;
transmitting a paging message, which is received by the user equipment based on the information related to paging message reception, on one of the plurality of carriers, wherein
an npdcch-NumRepetitionPaging information element is included in the information related to paging message reception,
said method further comprising:
transmitting to the UE via the SIB, another information related to paging message reception which does not include the npdcch-NumRepetitionPaging information element for a carrier, wherein
the npdcch-NumRepetitionPaging configured in SystemInformationBlockType2-NB is applied to the carrier by the UE, in a case that the other information related to paging message reception is received.

4. A base station, comprising:
a transceiver circuitry, configured to transmit to User equipment (UE) via a system information block (SIB), information related to paging message reception for a plurality of carriers which is applied by the user equipment to the plurality of carriers;
transmit a paging message, which is received by the user equipment based on the information related to paging message reception on one of the plurality of carriers, wherein
an npdcch-NumRepetitionPaging information element is included in the information related to paging message reception,
the transceiver circuitry configured to transmit to the UE via the SIB, another information related to paging message reception which does not include the npdcch-NumRepetitionPaging information element for a carrier, wherein the npdcch-NumRepetitionPaging configured in SystemInformationBlockType2-NB is applied to the carrier by the UE, in a case that the other information related to paging message reception is received.

* * * * *